US010917163B2

(12) United States Patent
Rutt et al.

(10) Patent No.: US 10,917,163 B2
(45) Date of Patent: Feb. 9, 2021

(54) INTEGRATED MIXED-SIGNAL RF TRANSCEIVER WITH ADC, DAC, AND DSP AND HIGH-BANDWIDTH COHERENT RECOMBINATION

(71) Applicant: SEAKR ENGINEERING, INC., Centennial, CO (US)

(72) Inventors: Paul Rutt, Longmont, CO (US); Jesse D. Hobart, Littleton, CO (US); Richard E. Perego, Thornton, CO (US)

(73) Assignee: SEAKR ENGINEERING, INC., Centennial, CO (US)

( * ) Notice: Subject to any disclaimer, the term of this patent is extended or adjusted under 35 U.S.C. 154(b) by 0 days.

(21) Appl. No.: 16/286,567

(22) Filed: Feb. 26, 2019

(65) Prior Publication Data
US 2020/0220613 A1 Jul. 9, 2020

Related U.S. Application Data

(63) Continuation-in-part of application No. 15/351,224, filed on Nov. 14, 2016, now Pat. No. 10,218,430, and
(Continued)

(51) Int. Cl.
*H04B 7/185* (2006.01)
*H04B 1/00* (2006.01)
(Continued)

(52) U.S. Cl.
CPC ....... *H04B 7/18515* (2013.01); *H04B 1/0039* (2013.01); *H04B 1/0042* (2013.01);
(Continued)

(58) Field of Classification Search
CPC .. H04B 1/0007; H04B 1/0014; H04B 1/0028; H04B 1/0038; H04B 1/0042;
(Continued)

(56) References Cited

U.S. PATENT DOCUMENTS 5,220,557 A 6/1993 Kelley
5,264,931 A * 11/1993 Yamada ............... H04N 9/642
348/720
(Continued)

FOREIGN PATENT DOCUMENTS

CA 2542445 A1 10/2007
EP 1029397 B1 8/2000
(Continued)

OTHER PUBLICATIONS

Berger, R. et al. (Sep. 19, 2007). "A System-On-Chip Radiation Hardened Microcontroller a SIC With Embedded SpaceWire Router," International SpaceWire Conference, Dundee, Scotland, pp. 1-15.
(Continued)

*Primary Examiner* — Young T. Tse
(74) *Attorney, Agent, or Firm* — Morrison & Foerster LLP

(57) ABSTRACT

An integrated analog to digital converting and digital to analog converting (ADDA) RF transceiver for satellite applications capable of flexibly processing high-bandwidth and low-bandwidth RF input signal(s). The RF transceiver may selectively distribute high-bandwidth RF input signals among one or more DSP pipelines for parallel processing of the RF input signals, and the RF transceiver may coherently recombine the processed signals from the one or more DSP pipelines to generate an RF output signal. The ADDA RF transceiver includes one or more ADCs, DSPs, and DACs, all on one or more ASICs, FPGAs, or modular electronic devices in a single semiconductor package. Further, the RF transceiver is radiation tolerant at the module, circuit, and/or system level for high availability and reliability in the ionizing radiation environment present in the space environment.

16 Claims, 13 Drawing Sheets

Related U.S. Application Data a continuation-in-part of application No. 15/263,134, filed on Sep. 12, 2016, now Pat. No. 10,243,650, said application No. 15/351,224 is a continuation of application No. 14/828,126, filed on Aug. 17, 2015, now Pat. No. 9,461,732, said application No. 15/263,134 is a continuation of application No. 14/828,126, filed on Aug. 17, 2015, now Pat. No. 9,461,732.

(60) Provisional application No. 62/037,816, filed on Aug. 15, 2014.

(51) Int. Cl.
| | | |
|---|---|---|
| *H04B 7/08* | (2006.01) | |
| *H04B 7/212* | (2006.01) | |
| *H04B 1/44* | (2006.01) | |
| *H04B 1/40* | (2015.01) | |

(52) U.S. Cl.
CPC .......... *H04B 1/0046* (2013.01); *H04B 1/40* (2013.01); *H04B 1/44* (2013.01); *H04B 7/08* (2013.01); *H04B 7/1851* (2013.01); *H04B 7/212* (2013.01)

(58) Field of Classification Search
CPC .......... H04B 1/0046; H04B 1/38; H04B 1/40; H04B 1/44; H04B 7/08; H04B 7/0817; H04B 7/1851; H04B 7/18515; H04B 7/212; H04B 1/0039
USPC ....... 375/144, 148, 219, 220, 222, 259, 260, 375/267, 349; 341/108, 110, 128, 129, 341/141, 144, 155; 455/500, 526; 710/69, 71
See application file for complete search history.

(56) References Cited

U.S. PATENT DOCUMENTS

| | | | |
|---|---|---|---|
| 5,285,264 A * | 2/1994 | Matsushita | H04N 9/64 348/571 |
| 5,375,146 A | 12/1994 | Chalmers | |
| 5,579,341 A | 11/1996 | Smith | |
| 5,640,424 A | 6/1997 | Banavong | |
| 5,717,717 A | 2/1998 | Yang | |
| 5,867,478 A | 2/1999 | Baum | |
| 5,956,346 A | 9/1999 | Levan | |
| 5,959,660 A | 9/1999 | Levan | |
| 6,009,130 A * | 12/1999 | Lurey | H04B 1/00 375/347 |
| 6,212,566 B1 | 4/2001 | Vanhoof | |
| 6,359,508 B1 | 3/2002 | Mucenieks | |
| 6,445,334 B1 | 9/2002 | Bradley | |
| 6,479,758 B1 | 11/2002 | Arima | |
| 6,624,780 B1 | 9/2003 | Fouts | |
| 6,701,141 B2 | 3/2004 | Lam | |
| 6,721,371 B1 | 4/2004 | Barham | |
| 6,819,706 B1 * | 11/2004 | Lim | H03G 3/3078 375/130 |
| 6,842,498 B2 | 1/2005 | Heinzl | |
| 6,898,233 B2 | 5/2005 | Philips | |
| 6,903,679 B2 | 6/2005 | Hanson | |
| 6,934,341 B2 | 8/2005 | Sahlman | |
| 7,099,949 B1 | 8/2006 | Vanhoof | |
| 7,333,053 B2 | 2/2008 | Lawrence | |
| 7,373,143 B2 | 5/2008 | Dygert | |
| 7,400,036 B2 | 7/2008 | Tan | |
| 7,408,898 B1 | 8/2008 | Brown | |
| 7,471,739 B1 | 12/2008 | Wright | |
| 7,962,662 B2 | 6/2011 | Richards | |
| 8,139,685 B2 | 3/2012 | Simic | |
| 8,174,428 B2 | 5/2012 | Wegener | |
| 8,331,461 B2 | 12/2012 | Wegener | |
| 8,380,138 B2 | 2/2013 | Wadhwa | |
| 8,406,707 B2 | 3/2013 | Pullela | |
| 8,457,021 B2 | 6/2013 | Schiff | |
| 8,463,142 B2 | 6/2013 | Zhao | |
| 8,489,056 B2 | 7/2013 | Wyville | |
| 8,625,726 B2 | 1/2014 | Kuan | |
| 8,659,309 B2 | 2/2014 | Howe | |
| 8,744,009 B2 | 6/2014 | Kleider | |
| 9,197,260 B2 | 11/2015 | Adnani | |
| 9,294,118 B2 | 3/2016 | Man | |
| 9,461,732 B2 | 10/2016 | Buehler | |
| 10,218,430 B2 | 2/2019 | Buehler | |
| 10,243,610 B2 | 3/2019 | Leinonen | |
| 2002/0122503 A1 | 9/2002 | Agazzi | |
| 2003/0054788 A1 | 3/2003 | Sugar | |
| 2003/0118081 A1 | 6/2003 | Philips | |
| 2003/0184472 A1 * | 10/2003 | Krikorian | H01Q 3/26 342/372 |
| 2004/0022332 A1 | 2/2004 | Gupta | |
| 2005/0027409 A1 | 2/2005 | Marshall | |
| 2005/0156775 A1 * | 7/2005 | Petre | H03M 1/121 341/155 |
| 2006/0028197 A1 | 2/2006 | Quiquempoix | |
| 2007/0285312 A1 | 12/2007 | Gao | |
| 2009/0103593 A1 * | 4/2009 | Bergamo | H04J 13/00 375/146 |
| 2009/0163162 A1 | 6/2009 | Hoffman | |
| 2010/0269022 A1 | 10/2010 | Clark | |
| 2011/0170619 A1 | 7/2011 | Anvari | |
| 2012/0250740 A1 | 10/2012 | Ling | |
| 2012/0256789 A1 * | 10/2012 | Bull | G01S 5/0221 342/357.25 |
| 2012/0300818 A1 | 11/2012 | Metreaud | |
| 2013/0155926 A1 | 6/2013 | Ly-gagnon | |
| 2013/0230078 A1 | 9/2013 | Chang | |
| 2014/0213174 A1 | 7/2014 | Scarpa | |
| 2014/0268964 A1 | 9/2014 | Xia | |
| 2014/0369677 A1 | 12/2014 | Tanaka | |
| 2015/0146826 A1 * | 5/2015 | Katabi | H04B 1/16 375/340 |
| 2015/0188646 A1 | 7/2015 | Bharadia | |
| 2015/0236750 A1 | 8/2015 | Choi | |
| 2015/0280893 A1 | 10/2015 | Choi | |
| 2015/0318914 A1 | 11/2015 | Scott | |
| 2015/0365177 A1 | 12/2015 | Blumenthal | |
| 2016/0050010 A1 | 2/2016 | Buehler | |
| 2016/0112226 A1 | 4/2016 | Martinez | |
| 2016/0127112 A1 | 5/2016 | Shalizi | |
| 2017/0054492 A1 | 2/2017 | Buehler | |
| 2017/0063446 A1 | 3/2017 | Buehler | |

FOREIGN PATENT DOCUMENTS

| | | |
|---|---|---|
| EP | 1143554 A2 | 10/2001 |
| EP | 1168883 A2 | 1/2002 |
| EP | 1589774 A1 | 10/2005 |
| EP | 1938563 A2 | 7/2008 |
| WO | WO2007038483 A3 | 4/2007 |
| WO | WO2014052925 A1 | 4/2014 |
| WO | WO2015031830 A1 | 3/2015 |
| WO | WO2016025953 A1 | 2/2016 |

OTHER PUBLICATIONS

European Extended Search Report, dated Jan. 16, 2018, for European Patent Application No. 15831689.3, nine pages.
European Office Action, dated Nov. 2, 2018, for European Patent Application No. 15831689.3, four pages.
Final Office Action dated Jan. 9, 2018 for U.S. Appl. No. 15/263,134, filed Sep. 12, 2016, twenty eight pages.
International Preliminary Report on Patentability, dated Feb. 21, 2017, for PCT Application No. PCT/US2015/045534, nine pages.
International Search Report and Written Opinion, dated Dec. 21, 2015, for PCT Application No. PCT/US2015/045534, eleven pages.
Non-Final Office Action dated Jun. 16, 2017, for U.S. Appl. No. 15/263,134, filed Sep. 12, 2016, nineteen pages.
Non-Final Office Action dated May 18, 2018 for U.S. Appl. No. 15/263,134, filed Sep. 12, 2016, twenty four pages.

(56) References Cited

OTHER PUBLICATIONS

Notice of Allowance dated Jun. 8, 2020, for European Patent Application No. 15831689.3, seven pages.
Notice of Allowance dated Nov. 6, 2018, for U.S. Appl. No. 15/263,134, filed Sep. 12, 2016, eight pages.
Sinclair, D. et al. (Aug. 1, 2013). "Radiation Effects and COTS Parts in SmallSats," Proceedings of 27th Annual AIAA/USU Conference pp. 1-12.

* cited by examiner

INTEGRATED MIXED-SIGNAL RF TRANSCEIVER WITH ADC, DAC, AND DSP AND HIGH-BANDWIDTH COHERENT RECOMBINATION

CROSS REFERENCE TO RELATED APPLICATIONS

This application is a continuation in part of U.S. patent application Ser. No. 15/263,134, filed Sep. 12, 2016, and U.S. patent application Ser. No. 15/351,224 (now U.S. Pat. No. 10,218,430), filed Nov. 14, 2016, which were continuations of U.S. application Ser. No. 14/828,126 (now U.S. Pat. No. 9,461,732), filed on Aug. 17, 2015, which claims priority from U.S. Provisional Patent Application No. 62/037,816, filed Aug. 15, 2014, which are hereby incorporated by reference in their entireties.

BACKGROUND

Current designs for down-converters and up-converters in satellite applications typically utilize amplifiers that use high power and have a high mass/weight, along with mixers, oscillators, and filter banks. Such devices consume an undesirable amount of Size, Weight, Power, and Cost (SWaPC) and, because of the high part count, such devices have poorer than desired reliability and are difficult and time consuming to manufacture and test. Satellite payloads are often powered by solar cells (e.g., photovoltaic arrays) and batteries coupled to the satellite. The launch vehicle may be selected with a particular payload or combination of payloads in mind, and cost is associated with the type of launch vehicle (e.g., rocket) used and the weight of each payload carried thereon. Accordingly, a primary objective of launching satellites into orbit is to keep power consumption and the weight of the satellite as low as possible.

Additionally, an RF input signal which is received and processed by a satellite, such as a communications, scientific, imaging, reconnaissance satellites, and the like, must be received by an reception module (e.g, an antenna, antenna array such as a direct radiating array (DRA) or phased array, or optical transceiver). The received signal must typically be processed by an amplifier, a balun (balanced to unbalanced), and filters prior to processing by a central processing unit (CPU), digital signal processor (DSP), and the like. The input amplifiers, balun, and filters may be referred to collectively as an RF input chain. Other components may be provided or excluded in the RF input chain. Amplifiers, baluns, and filters all introduce unique types of phase and/or amplitude distortion or discontinuity, introduce delay mismatch, have non-linear response characteristics, and may have other differences in signal response which must be compensated for or corrected prior to processing by a DSP core. This issue is exacerbated by the use of multiple RF input chains introducing various distortion, discontinuities, and other frequency response characteristics to the input signal. Compensating for these signal response characteristics by multiple DSP cores or a DSP core having more than one pipeline or lane can require significant processing time and power, and in some instances the signal reconstruction may be imperfect or impossible resulting in data loss.

Some systems provide one or more DSP pipelines for processing RF input signals (e.g., one or more separate bitstreams), wherein one RF input signal is received by a dedicated RF input chain, converted to a digital signal by an ADC, processed by a DSP pipeline, and converted back to analog by a DAC for transmission by an RF output chain. However, the DSP pipeline may be only designed to handle a predetermined bandwidth, and may be a limiting factor on the bandwidth throughput of the system (whereas an RF chain and ADC/DAC may in some examples be able to process higher bandwidths than the DSP is designed for). For example, if a DSP pipeline is designed for 2.5 GHz bandwidth, then the maximum bandwidth of this implementation of a RF transceiver system would be 2.5 GHz regardless of the bandwidth capability of the RF input and output chains or the ADC(s) and DAC(s).

The harsh environment faced by a satellite can increase the challenge of designing electronic circuitry. One of the primary environmental risks in a satellite application is associated with the ionizing radiation environment present in space. It should be noted that radiation effects associated with ionizing radiation are also present in terrestrial applications, though the rate of occurrence in terrestrial applications is significantly lower than in space applications. The radiation environment in space includes heavy ions, protons, and neutrons which can temporarily impact the normal operation of semiconductor devices via single event effects (SEE). Additionally total ionizing dose (TID), and/or displacement damage dose (DDD) effects are caused by long-term exposure to radiation accumulated during the mission duration and impact semiconductor performance through parametric degradation including current leakage and timing shifts. Reference may be made to "Single Event Effects in Aerospace" by Edward Petersen, October 2011. ISBN-10: 0470767499; ISBN-13: 978-0470767498, the entire contents of which may be incorporated herein in their entirety.

The effects of SEE are generally instantaneous and can impact the operation of the semiconductor circuit. These SEE effects include single event latchup (SEL), single event upset (SEU), single event transient (SET), and single event functional interrupt (SEFI). Mitigation for SEL can be provided via use of a technology such as silicon on insulator (SOI). The effects of SEU, SET, and/or SEFI can result in a serial communication line (commonly referred to as a lane) to go into an invalid state (for example, due to a loss of lock in the clock circuitry, an induced error in the control logic, and the like) in which valid data is no longer being transmitted or received for an extended period of time. The rate of occurrence of soft errors in terrestrial applications for a typical semiconductor chip design is significantly lower than the rate of occurrence of SEU, SET, and/or SEFI for the same semiconductor chip design in space applications.

It is against this background that the techniques disclosed herein have been developed.

SUMMARY

Disclosed herein is an integrated analog to digital converting and digital to analog converting (ADDA) RF transceiver for satellite applications, configured to replace conventional analog RF down-conversion and up-conversion circuitry. The integrated ADDA RF transceiver includes a plurality of radiation tolerant high speed analog to digital conversion (ADC) units, each configured to take in an RF signal and output a sampled digital signal; a plurality of radiation tolerant high speed digital to analog conversion (DAC) units, each configured to take in a sampled digital signal and output an RF signal; a plurality of radiation tolerant digital inputs; a plurality of radiation tolerant digital outputs; a plurality of radiation tolerant digital signal processing (DSP) cores, each capable of processing data from one or more high speed ADC unit and outputting the processed data on one or more digital outputs; and a plurality of radiation tolerant digital signal processing (DSP) cores, each capable of processing data from a digital input and outputting the processed data to one or more DAC unit.

The integrated ADDA RF transceiver may also include selectively providing the output from a single high speed ADC unit to one or more DSP cores. The integrated ADDA RF transceiver may also include providing the output from one or more DSP cores to a single high speed DAC unit. The one or more DSP core(s) may include: a digital mixer operative to perform frequency translation of data from RF to baseband or from baseband to RF; a decimating filter operative to suppress aliasing and downsample a frequency downconverted baseband signal to its information bandwidth, to reduce the output data rate; and an interpolating filter operative to suppress images while upsampling a baseband signal to the output sample rate prior to frequency upconversion, to reduce the input sample rate.

The digital frequency synthesizer may include a lookup table (LUT) storing a sampled sinusoid; and a digital phase accumulator, wherein phase is encoded as an integer value mapping to a lookup table address. The digital phase accumulator may be incremented, and a sample is produced from the LUT at the corresponding address. The one or more DSP core(s) may include: a cascade of decimating frequency translating filters, to hierarchically downconvert and downsample digital data from one or more of the high-speed ADC units; and a cascade of interpolating frequency translating filters, to hierarchically upconvert and upsample digital data to feed one or more of the high-speed DAC units.

The integrated ADDA RF transceiver may further include a digital tune frequency input for rapidly changing the up- or down-translation frequency during operation of the ADDA unit. The integrated ADDA RF transceiver may further include a digital bandwidth selection input for rapidly changing the processing bandwidth, which corresponds to the interpolation or decimation ratio. The integrated ADDA RF transceiver may further include a TDMA time slot power activation-deactivation time synchronization input, to save power when operating during the inactive portion of a TDMA frame. The digital inputs and outputs may include a configurable complex floating point data converter to conserve digital data input and output communication bandwidth while preserving data fidelity regardless of the interpolation or decimation ratio. The complex numbers may include i and q (i.e., in-phase and quadrature) portions that share one or more bits related to the exponents thereof.

The integrated ADDA RF transceiver may further include radiation hardened flip-flops in place of configuration and other registers to ensure operation in a space environment with a low error rate. In some examples, the transceiver may be implemented on a single monolithic silicon device (that is, all components are provided on a single semiconductor substrate). In other examples, the transceiver may be implemented on an application-specific integrated circuit (ASIC), a field-programmable gate array (FPGA), a structured ASIC, a modular electronic system having various "chiplets" such as the DARPA Common Heterogeneous Integration and Intellectual Property Reuse Strategies (CHIPS) initiative, and the like. In another example, the transceiver may be implemented on a multi-chip module where one or more distinct silicon die may be provided in a single package. For example, in some implementations various elements such as the analog to digital converter (ADC), digital to analog converter (DAC), Serializer/Deserializer (SerDes), digital signal processor (DSP), and/or signal regeneration processing circuitry may be provided on distinct chips or die within the same semiconductor package. In still other examples, the transceiver may be implemented on a hybrid device including active and passive integrated circuit elements.

The integrated ADDA RF transceiver may further include selectively disabling unused digital inputs or outputs when processing less than the maximum bandwidth. The integrated ADDA RF transceiver may further include utilizing flexible data packing of data in the digital outputs and flexible data unpacking of data from the digital inputs.

Also disclosed herein is a method used in a satellite, including: providing an application specific integrated circuit (ASIC), FPGA, structured ASIC, or modular system of chiplets that: down-converts a first RF signal and converts it to a lower frequency signal; receives the lower frequency signal and converts it to a first digital signal; converts the first digital signal to a second digital signal; receives the second digital signal and converts it to an analog signal; and receives the analog signal and converts it to a second RF signal.

Also disclosed herein is a method used in a satellite, including: providing an application specific integrated circuit (ASIC), FPGA, structured ASIC, or modular system of chiplets that: down-converts a first RF signal and converts it to a lower frequency signal; receives the lower frequency signal and converts it to a first digital signal; receives a second digital signal and converts it to an analog signal; and receives the analog signal and converts it to a second RF signal.

Also disclosed herein is a method used in a satellite, including: providing an application specific integrated circuit (ASIC), FPGA, structured ASIC, or modular system of chiplets that: receives a first analog RF signal and converts it to a first digital signal; down-converts the first digital signal to create a lower-frequency second digital signal; receives a third digital signal and up-converts the third digital signal to create a higher-frequency fourth digital signal; and converts the fourth digital signal to a second analog RF signal.

Also disclosed herein is an integrated analog to digital converting and digital to analog converting (ADDA) RF transceiver for satellite applications, configured to replace conventional analog RF down and up conversion circuitry. The integrated ADDA RF transceiver includes a plurality of high speed analog to digital conversion (ADC) units, each configured to take in an RF signal and output a sampled digital signal; a plurality of high speed digital to analog conversion (DAC) units, each configured to take in a sampled digital signal and output an RF signal; a plurality of digital inputs; a plurality of digital outputs; and a plurality of digital signal processing (DSP) cores, each capable of processing data from one high speed ADC unit and outputting the processed data on one or more digital outputs and capable of processing data from a digital input and outputting the processed data to one DAC unit. The entire ADDA RF transceiver is contained in a single package. A single package, as is recognized in the art, describes an enclosure where all of the RF transceiver components and circuitry are provided on one or more silicon substrate die or chip(s) with mechanical or environmental protection and which can include interconnections on or between the silicon die (e.g, inter-chip connections), and also includes connections between the one or more silicon substrates or die to an external package connector (e.g., package to die connections, which may be referred to as wire bonding) for integrating or interfacing on a printed circuit board, circuit card, and the like (e.g., package-to-package connection, board-to-board interconnection, card-to-card interconnection, etc.). The circuitry described above is radiation tolerant at the individual circuit element level as confirmed by testing and/or analysis, radiation tolerant at the system level, or a mixture of both. The circuitry described above can handle a broad range of RF frequencies and bandwidths.

The present disclosure provides a versatile RF transceiver system capable of processing jobs with subchannels with small bandwidths and individually processed antenna elements (e.g., for beamforming), as well as processing jobs having large contiguous bandwidths, all in a single package and/or on a single ASIC, FPGA, modular electronic systems, and the like. As will be discussed below, DSP pipelines may be designed with a particular bandwidth in mind. However, based on the present disclosure a system may be designed which allows flexibility to deal with both large and small bandwidths selectively using one or a plurality of DSP pipelines.

In one example of an RF transceiver as presently disclosed, a single RF input chain may receive a high-bandwidth (e.g., 10 GHz) input signal and convert the input signal to a digitally sampled signal using an ADC. The digitally-sampled signal may be broadcast to one or more DSP pipelines which process portions of the input signal in parallel. After processing in respective DSP pipelines, the processed input signal portions are then added together or otherwise recombined such that a coherent output signal is reconstructed from the portions of the input signal processed by each DSP pipeline. The coherently recombined signal portions may then be converted to an analog signal by a DAC and transmitted via an RF output chain. In the non-limiting example of a 10 GHz bandwidth RF input signal and a system with four DSP pipelines, each DSP pipeline could be configured to process 2.5 GHz of bandwidth. Although 10 GHz is provided as an example, the present disclosure is not limited to this and larger bandwidths may be processed if the DSP pipelines are capable of processing larger bandwidths individually, or if more DSP pipelines are provided.

BRIEF DESCRIPTION OF THE DRAWINGS

The disclosure herein is described with reference to the following drawings, wherein like reference numbers denote substantially similar elements.

DETAILED DESCRIPTION

Figure 1:
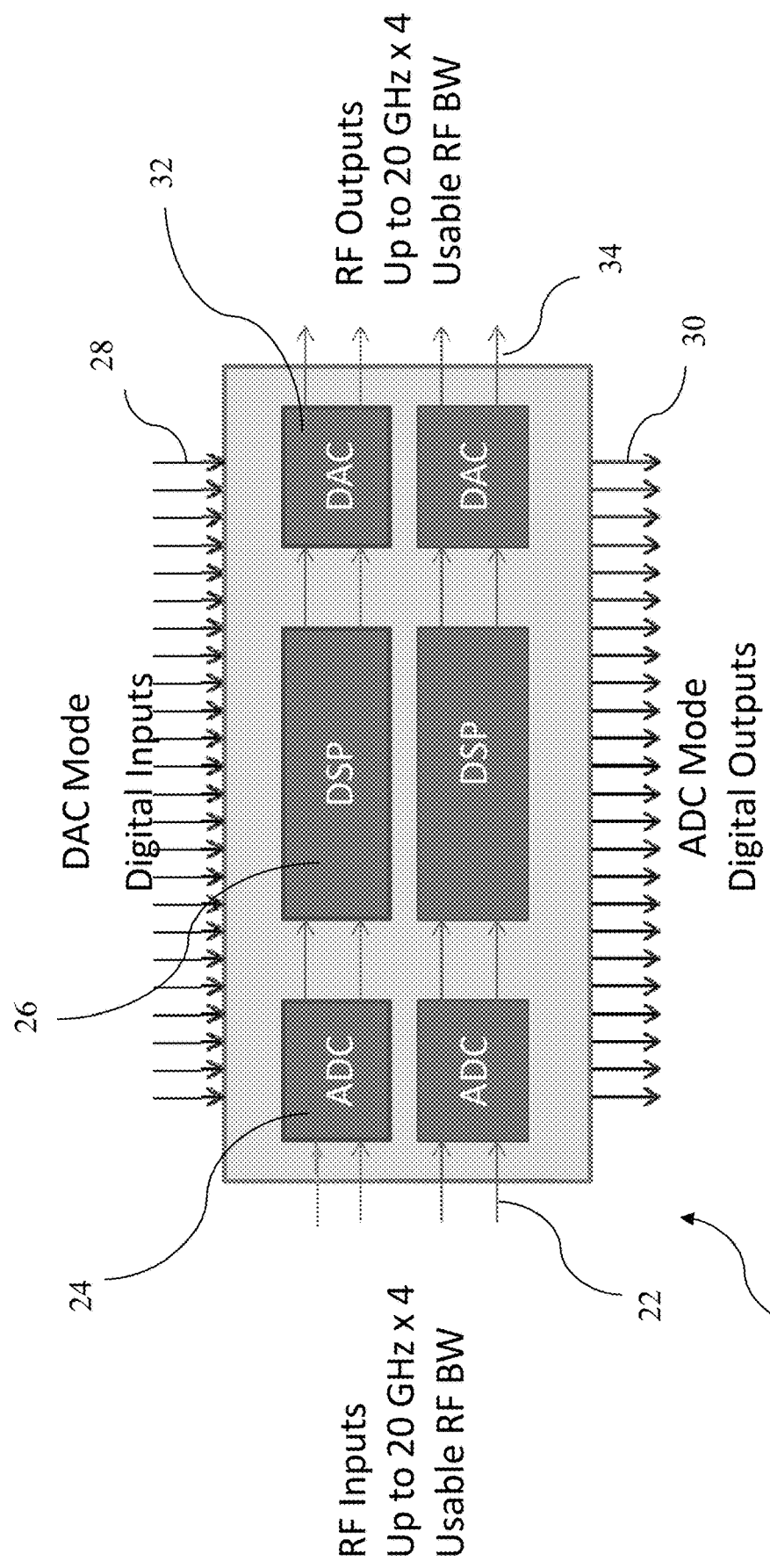
FIG. 1 is a block diagram of an ADDA RF Transceiver.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

The techniques and designs disclosed herein relate to the use of such circuitry in satellite-based applications. They include the use of an Application Specific Integrated Circuit (ASIC), FPGA, structured ASIC, modular electronic system, and the like, for a portion of the down-converting, the analog-to-digital conversion (ADC), the digital signal processing (DSP), the digital-to-analog conversion (DAC), and a portion of the up-converting. Specifically, the DSP on the ASIC can perform certain functionality that earlier designs performed in the analog domain (at a minimum, mixing and filtering). The use of an ASIC in satellite-based applications is challenging because of the radiation affected upsets, transients, and functional interrupts discussed in the background. It is noted that although portions of the present disclosure may refer to the use of an ASIC, the present disclosure is not limited to this and the RF transceiver components may be provided on one or more ASICs, FPGAs, structured ASICs, a modular electronic system having various "chiplets" such as the DARPA Common Heterogeneous Integration and Intellectual Property Reuse Strategies (CHIPS) initiative, and the like, all within the same semiconductor package. Accordingly, when the term ASIC is used in the present disclosure, a person having ordinary skill in the art would recognize that the components could be provided on FPGAs, structured ASICs, modular electronics systems, and a mixture of these technologies.

In one embodiment, the design is based on a commercially available semiconductor process with a feature size in the range of 10 nm to 45 nm. The ADC may perform at a sampling rate of 64 Gigasamples per second (providing a 20 GHz usable bandwidth). Each of the ADC and the DAC may consume 1.1 Watts per channel. The ADC and DAC units may each include built-in capture/playback buffers.

A simplified RF transceiver 20 is shown in FIG. 1. In this simplified example, it may have an RF throughput of 80 GHz. It may operate in ADC mode or DAC mode. It may only consume 8 Watts of power at a maximum. The RF transceiver 20 includes a plurality of RF Inputs 22 that are provided to one or more Analog-to-Digital Converters (ADCs) 24. The digital outputs of the ADCs 24 are provided to one or more Digital Signal Processors (DSPs) 26. A plurality of Digital Inputs 28 are also provided to the DSPs 26, just as a plurality of Digital Outputs 30 are provided from the DSPs 26. Some digital outputs from the DSPs 26 are provided to one or more Digital-to-Analog Converters (DACs) 32. These DACs 32 provide a plurality of RF Outputs 34. It should be noted that the RF transceiver may be contained on one die or on a plurality of die, all located in the same package.

Figure 2:
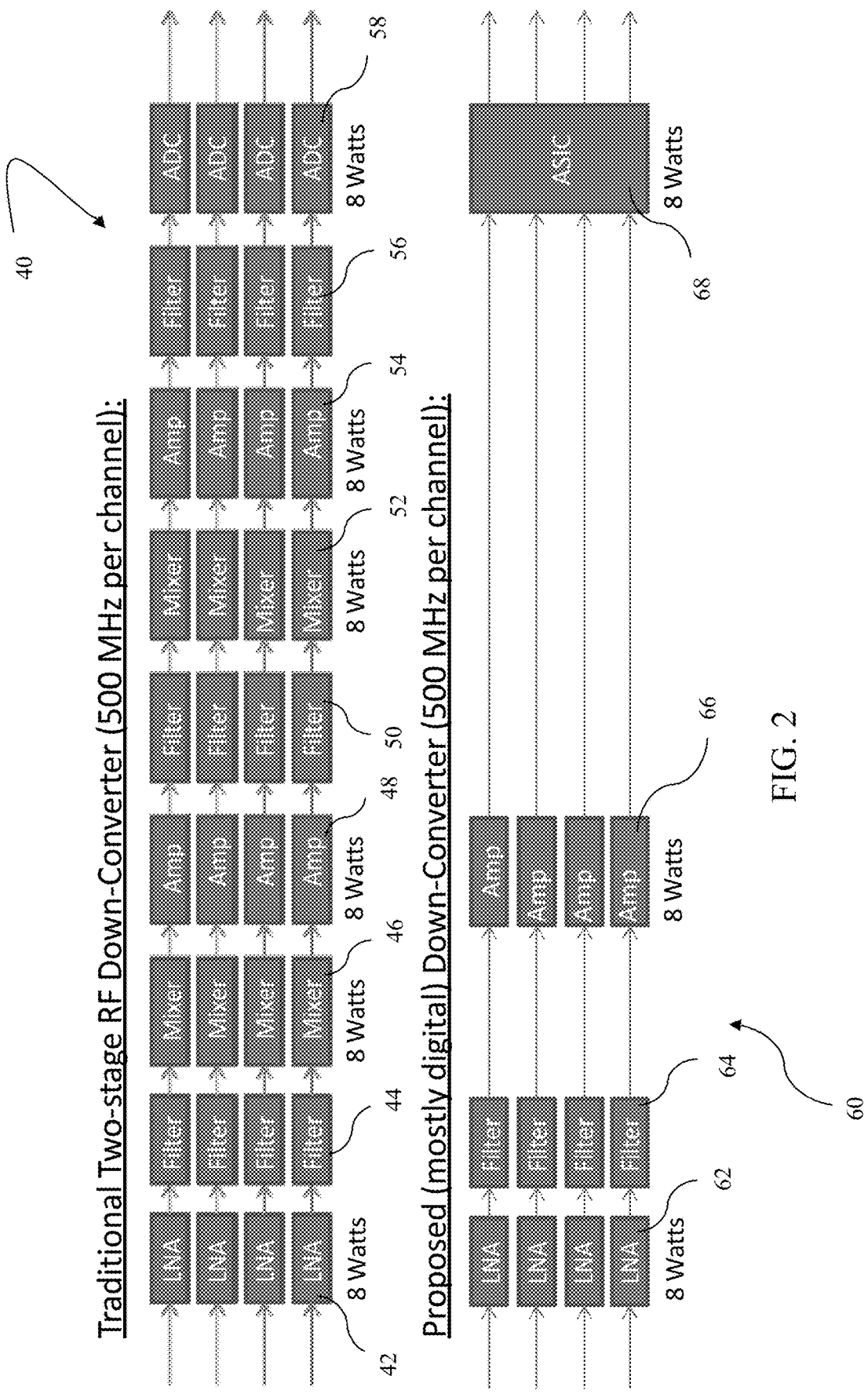
FIG. 2 is a comparison of a prior art technique and the proposed technique for down-conversion.

FIG. 2 compares a traditional two-stage RF down-converter (500 MHz per channel) to a proposed down-converter (500 MHz per channel) that is mostly digital. As can be seen, the new design results in a 50% power reduction and a 63.9% parts reduction. In addition, it is ultra-wide-band capable. A traditional two-stage RF down-converter 40 is shown with a bank of low noise amplifiers (LNAs) 42, followed by a bank of filters 44 (likely bandpass), a bank of mixers 46, a bank of amplifiers 48, a bank of filters 50

(again, likely bandpass), a bank of mixers 52, a bank of amplifiers 54, a bank of filters 56 (again, likely bandpass), and a bank of analog-to-digital converters (ADCs) 58. With the improvements disclosed herein, this down-converter 40 can be replaced with a (mostly digital) down-converter 60 that includes a bank of low noise amplifiers (LNAs) 62, followed by a bank of filters 64 (likely bandpass), a bank of amplifiers 66, and an application-specific integrated circuit (ASIC) 68 described herein (or in other examples an FPGA 68, structured ASIC 68, modular system 68, and the like). As can be appreciated, the many of the analog and power-intensive components have been replaced with functionality in an RF transceiver provided in a single semiconductor package on an ASIC, FPGA, structured ASIC, or modular electronic system. This is at least partially accomplished by direct conversion of the RF signal to baseband. As an example, it may include 16 input RF channels (of course, the actual number is easily scalable). At 7.5 Watts/channel power consumption, the total power consumption may be 120 Watts. This includes ADCs, amplifiers, and point-of-load converters. As can be appreciated, one design can accommodate many different missions. It may be able to down-convert and digitize any RF, ranging from 100 MHz to 20 GHz. The bandwidth per port may be configurable over the range from 100 MHz to 20 GHz.

One name for the devices disclosed herein may be ADDA, which comes from the first letters of ADC, DSP, DAC, ASIC. As discussed above, however, the present disclosure is not limited to being provided on an ASIC, and may instead be provided on an FPGA, structured ASIC, modular electronic system, and the like. As has been discussed, it may be intended to replace conventional RF up/down-conversion circuitry with mostly digital logic. It may be able to go directly from RF frequencies up to Ku band (roughly 20 GHz maximum), or Ka band (roughly 30 GHz maximum). It may be able to support instantaneous bandwidths up to 3 GHz per port. It will be appreciated that and other version of ADDA with more or less inputs, outputs, or components could also be created.

Using the techniques discussed herein, it is possible to achieve typical raw internal sample rates per port of 64 GSps (real) (or 128 GSps or even higher); typical internal digital clock frequencies of 500 MHz; minimum decimation/interpolation 8×→4 GSps complex; maximum decimation/interpolation of 1024×→62.5 MSps complex; and selectable power of two decimation/interpolation.

Complex valued signals have a real and an imaginary component. A complex signal is required to fully unambiguously encode the instantaneous state of an oscillating system into a single number. In a physical system, a complex signal might encode the position and velocity at each instant in time, as kinetic energy and potential energy are exchanged back and forth. In an electrical system, a complex signal would encode the exchange between the magnetic field and the electrical field. Complex signals carry no more information than real valued signals at twice the sample rate, but real valued signals require additional processing, such as a Hilbert transformation, to extract the instantaneous state of the system. Counterintuitively, complex signals thus enable more efficient and simpler processing in many signal processing applications. The format of the information becomes more complex, but the processing of the data becomes less complex.

The DSP may have multiple different personalities or forms/modes/configurations in which it may be used. Specifically, in an input mode, it has the ability to tune to an input RF band of interest, filter, and decimate to a bandwidth of interest. In an output mode it has the ability to interpolate up to the raw output sample rate and digitally up-convert to the output RF of interest. There are multiple modes of operation, which include having four active ADCs, four active DACs, two active ADCs and two active DACs, one active ADC feeding all four DSP cores, and four DSP cores feeding one active DAC. It features flexible data packing/unpacking to/from High-Speed Serial Links. High-Speed Serial Links could include any of a variety of protocols based upon SerDes (Serializer/Deserializer) technology, including JESD204B, JESD204C, PCI Express, Ethernet, Interlaken, XAUI, Xilinx Aurora, Altera Serial Lite, ultra short reach (USR) SerDes such as Kandou Bus Glasswing™ SerDes at speed including but not limited to 500 Gb/s and 125 Gb/s throughput, Intel Advanced Interface Bus (IAB), JESD-247 Multi-wire Multi-level I/O standard, Common Electrical I/O (CEI) Optical Internetworking Forum (OIF) "Common Electrical I/O Electrical and Jitter Interoperability agreements for 6 G+ bps, 11 G+ bps, 25 G+ bps I/O and 56 G+ bps (document IA #OIF-CEI-04.0 dated Dec. 29, 2017), and the like. Other emerging standards may be implemented such as OIF Common Electrical I/O—112G—XSR for die-to-die (D2D) and die-to-Optical Engine (D2OE), OIF Common Electrical I/O—112G—Very Short Reach for chip-to-module (c2m) interface, OIC Common Electrical I/O—112G in Multi-Chip Module (MCM), OIC Common Electrical I/O—112G—Long Reach (LR), and OIC Common Electrical I/O—112G—Medium Reach (MR), and OIC Common Electrical I/O—400ZF Link. Unneeded SerDes lanes can be turned off to save power. Unneeded ADCs/DACs/DSPs can be turned off to save power. There may be a TDMA time-slot power-up/power-down input pin. In such case, it would be nice to have less than a 100 μs ramp-up/down time. The typical TDMA frame is 100 ms and the minimum/typical/maximum duty cycles are typically 1%/10%/100%.

Reconfigurable DSP elements enable re-targeting frequency design to future implementation technologies. Therefore, no redesign of the DSP is required to support different RF tune frequencies or bandwidths, regardless of the implementation technology. Even if implemented in a technology which enables processing at much higher sample rates, access to higher RF frequencies and bandwidths, the DSP can be programmed by setting its configuration bits to retune accordingly.

DSP Feature List—The DSP algorithm and circuitry may include all or a subset of the following features on one or more die within the same semiconductor package, and which are co-optimized and which interact to result in system performance which is greater than the sum of its parts:

Digital Frequency Synthesizer—Frequency synthesis is accomplished via a programmable lookup table (LUT) which stores complex valued samples from one quarter of a sampled sinusoid. An index counter increments the LUT address such that the LUT values are accessed in a linear sequence. When the counter reaches the end of the stored waveform, it resets to zero and starts again. Each time the counter resets, a quarterwave state machine's state is advanced, such that the retrieved sinusoid is manipulated into the correct quadrant of the sinusoid being generated. The combination of a programmable LUT, programmable LUT depth, and quarterwave manipulation results in phase-noise-free sinusoid generation with orders of magnitude more frequency choices available compared with a fixed table length. This enhanced additional frequency resolution improves the performance of a channelized system, and reduces the performance requirements on the channelizer by relaxing its transition band specifications.

Digital mixer—The digital mixer multiplies the signal to be frequency translated by the sinusoid created by the Digital Frequency Synthesizer, and results in a signal whose subcarriers are closely aligned to the channelizer's subchannel centers.

Decimating filter—The decimating filter is used in the Rx direction and consists of a cascade of efficient decimation filters, supporting a configurable number of decimate-by-two operations, followed by a configurable decimate by three or five operation. The configurable decimation selection allows the channelized bandwidth to more closely match the occupied bandwidth of the signal, for improved power efficiency. The decimating filter provides improved roll-off compared to an analog bandpass filtering approach.

Interpolating filter—The interpolating filter is used in the Tx direction and performs the exact inverse operation of the decimating filter, supporting the same interpolation factors as decimation factors. The purpose of the interpolating filter is to upsample a baseband complex signal to a higher sample rate, while limiting the upsampling images.

Equalizer—The equalizer is used to time and phase align multiple channels of data such that they are time, phase, and amplitude aligned across frequency, in order to facilitate beamforming. The programmable equalizer also provides improved filtering versus analog filtering approaches.

Channelizer—The channelizer, which operates in the Rx direction, is configurable to decompose the spectrum into a number of spectrally separated subchannels spanning the passband. This, combined with the beamformer, allows each subchannel to be individually beamformed so that multiple users, each transmitting on different frequencies, can each be assigned their own optimized subchannel-beam, in order to communicate without interference with the other users. Rx subchannel-beams may then be routed independently through the system via the router, to be transmitted on one or more Tx subchannel beams. In some examples, as discussed below, the channelizer may be a near perfect reconstruction channelizer or other polyphase filter bank capable of producing channels or subchannels with a roll-off at the subchannel cross-over point of approximately −3 dB such that the −3 dB points of adjacent subchannel filters align and unity gain is achieved. It is noted that 3 dB is exemplary and the present disclosure is not limited to this, and other roll-off values may be used as long as unity gain can be achieved at the crossover point of adjacent subchannels such that a reconstructed signal can be generated with little to no signal data loss.

An OFDM (orthogonal frequency division multiplexing) filter bank is an alternative to channelization, performing a similar function (spectral decomposition), at a reduced die-area and with reduced power consumption. It is only compatible with systems where the modems on the ground emit waveforms compatible with OFDM, however. i.e., the modems (ground terminals) must ensure they transmit on frequencies which are orthogonal at the receiver (spacecraft).

Reconstructor—The reconstructor operates in the Tx direction, and performs the opposite function of the channelizer. It combines multiple subchannels together into a single wider bandwidth signal for driving the DAC. As discussed above with respect to the channelizer, a near perfect reconstruction channelizer may be provided having a channelization module and reconstruction module which generate and reconstruct channels and subchannels with little to no signal data loss.

Beamformer—The beamformer operates in both Tx and Rx directions. In the Rx direction, it combines multiple subchannels from different antenna elements but at the same frequency together to form input subchannel-beams, using spatial diversity to isolate multiple users transmitting on the same frequency. In the Tx direction it spreads information from each user out across multiple output antenna elements such that the desired beams are radiated via the coherent combination of the element patterns. The digital beamformer enables flexible beamforming and beamsteering, which provide the following benefits:

Widening of beam spacing to enable full coverage with partial constellation.

Narrowing of beam spacing to provide increased density and revenue for fully populated constellation.

Beam steering to target specific users, or to provide improved non-interference.

Digital beamforming enables power increase for one of the beams to counter adverse weather or to increase capacity, at the expense of the other beams.

Crest Factor Reduction (CFR)—CFR operates in the Tx direction to improve the NPR of a multicarrier beamformed signal, prior to the DAC.

Digital Pre-Distortion (DPD)—DPD operates in the Tx direction to apply the opposite distortion to the signal that the amplifier will apply, such that the combination of the DPD followed by the amplifier behaves like an ideal soft limiter, allowing the amplifier to driven at a reduced backoff for a given NPR requirement.

Router—In the Rx direction, the router routes beamformed subchannel data from the input to the appropriate SerDes lane(s) such that it will be received by the desired downstream chip. In the Tx direction, the router routes beamformed subchannel data from the input to the appropriate DSP path such that it may be output by the desired DAC.

Regeneration—Demodulation of a signal and re-modulation of the signal into the same or a different signal format (e.g., conforming to the same or a different standard). Regeneration may be provided on the same DSP core or DSP chip as the other features listed, or may be a separate DSP core or chip. Regeneration may provide the advantage of not adding additional degradation due to processing of the signal by the chip. That is, a received signal having a 10 dB signal to noise ratio (SNR) may be demodulated and re-modulated with an output signal having substantially the same SNR.

Built-in high-resolution ADC and DAC units may contain calibration and built-in self-test (BIST) functionality. They may be able to stimulate the inputs to the ADC units and collect/analyze outputs of the DAC units. They may include built-in capture/playback buffers. The BIST algorithm may be able to validate the ADDA unit with a simple test fixture. The calibration may include LUT-based linearization of each sub-ADC/sub-DAC.

While various specific types of communication interfaces such as SerDes, JESD204, and JESD204B, Kandou Bus Glasswing, Intel Advanced Interface Bus, JESD-247, and the like as discussed above, it should be understood that the teachings herein are equally applicable to any type of digital communication interface that include one or more signal lines, operating in serial or parallel fashion. Additional communication interfaces also include optical communication, proximity communication, and wireless communication. Optical communication uses photons rather than electrons for communication. Proximity communication utilizes capacitive coupling rather than direct connection via wires.

Wireless communications includes interfaces such as WiFi including interfaces compliant with IEEE 802.11, ZigBee including interfaces compliant with IEEE 802.15.4, and Bluetooth including interfaces compliant with IEEE 802.15.1.

Due to the ionizing radiation environment experienced by electronics operating in satellite applications, it may be desirable for all or portions of the electronics to be radiation hardened or radiation tolerant. This can include any or some combination of electronics that have been radiation hardened by process (having to do with the underlying semiconductor technology regarding how the electronic device is fabricated), by design (having to do with the physical layout of the circuit elements on the die) or by other means. Radiation tolerance may be determined via test, analysis, or test and analysis of devices whose design was not intentionally optimized for use in an ionizing radiation environment.

The harsh environment faced by a satellite can increase the challenge of designing electronic circuitry. One of the primary environmental risks in a satellite application is associated with the ionizing radiation environment present in space. It should be noted that radiation effects associated with ionizing radiation are also present in terrestrial applications and such radiation effects are generally termed soft errors. The ionizing radiation environment in space includes heavy ions, protons, and neutrons which can impact the normal operation of semiconductor devices via single event effects (SEE), total ionizing dose (TID), and/or displacement damage dose (DDD). The effects of TID and DDD are generally cumulative over the mission duration and impact semiconductor parameters including current leakage. The effects of SEE are generally instantaneous and can impact the operation of the semiconductor circuit. These SEE effects include single event latchup (SEL), single event upset (SEU), single event transient (SET), and single event functional interrupt (SEFI). Mitigation for SEL can be provided via use of a technology such as silicon on insulator (SOI). The effects of SEU, SET, and/or SEFI can include causing a serial communication line (commonly referred to as a lane) to go into an invalid state (an example would be loss of lock) in which valid data is no longer being transmitted or received for an extended period of time. The rate of occurrence of soft errors in terrestrial applications for a typical semiconductor chip design is significantly lower than the rate of occurrence of SEU, SET, and/or SEFI for the same semiconductor chip design in space applications.

The mitigation of SEU, SET, and/or SEFI in semiconductor chip designs for space applications can be performed using a variety of techniques including the selection and optimization of materials and processing techniques in the semiconductor fabrication (radiation hard by process (RHBP)), and by the design and fabrication of specialized structures in the design of the chip which is then fabricated via conventional materials and processes in the semiconductor fabrication process (radiation hard by design (RHBD)). There are additional techniques for providing system level mitigation in systems that include semiconductor chips that are either RHBP, RHBD, or conventional (not specifically optimized for use in an ionizing radiation environment), such SEU, SET, and/or SEFI mitigation techniques are referred to in this application as system level radiation mitigation techniques (SLRMT).

The effective design of electronics systems for use in the space ionizing radiation environment requires that the system design team make effective and efficient use of components that are either RHBP, RHBD, and/or conventional and often includes the use of SLRMT. The optimization of the component selection and SLRMT depends to a large extent on the specific details of the radiation effects that are to be mitigated and the desired level of system radiation tolerance to be obtained. Many SEU, SET, and/or SEFI are generally best mitigated as close as possible, both spatially and temporally, to where the SEE induced event occurred in the component or system level circuit to provide effective and efficient mitigation of such effects. For example, the duration of SET induced in ASIC technology nodes with a feature size<90 nm (nanometers), can be <1 ns (nanosecond), and can be as short as several tens of ps (picoseconds) for feature sizes<32 nm. The mitigation of such short duration SET within the same semiconductor package can provide for a more efficient implementation of SET mitigation relative to an approach which spans two of more chips in separate locations within the same system. This efficiency results from the ability to detect and mitigate spatially and/or temporally close to the source of the SEE induced errors.

Radiation test may be accomplished using a beam of charged particles from a particle accelerator where the charged particle beam may include protons and/or heavy ions and the accelerator may be a cyclotron or a linear accelerator. The beam energy in the case of a proton beam may be in the range of 0.1 MeV to over 200 MeV and is typically in the range of approximately ≥1 MeV (mega electronVolts) to either approximately 65 or 200 MeV. The beam in the case of a heavy ion beam may have a linear energy transfer (LET) in the range of 0.1 to over 100 MeV cm$^2$/mg (mega electronVolt-square centimeter per milligram) and is typically in the range of ≥0.5 to approximately 60 to 85 MeV cm$^2$/mg. The total fluence of particles used in such tests can vary considerably and is often in the range of $10^6$ to over $10^{12}$ particles per cm$^2$ at each beam energy in the case of a proton beam and is often in the range of $10^2$ to over $10^8$ particles per cm$^2$ at each LET value in the case of a heavy ion beam. The number of radiation induced upsets (SEU), transients (SET), and/or functional interrupts (SEFI) is often expressed as a cross section which relates to the number of observed events in a given area (typically 1 cm$^2$) as a function of the beam fluence. The cross section is no greater than 1.0 and can be smaller than $10^{-10}$ cm$^2$, it is often in the range of approximately $10^{-2}$ to ≤$10^{-10}$ cm$^2$. A device is generally considered to be radiation tolerant if the number of detected SEU, SET, and/or SEFI is sufficiently small that it will not have a significant impact on the operation of the system or circuit containing one or more instances of that device. A heavy ion cross section≤$10^{-4}$ cm$^2$ at a LET≥37 MeV cm$^2$/mg as demonstrated by test and/or analysis is an example of a cross section which may be sufficient to be demonstrate that a given device is radiation tolerant. The heavy ion or proton cross section that is measured or determined by analysis for a device at one or more beam LET values or beam energy values to be considered radiation tolerant may vary considerably and depends in part on the anticipated orbit for the satellite and the extent to which the circuit and/or system containing that device is capable of maintaining the desired operation when a SEU, SET, and/or SEFI occurs.

All electrical components set forth in the present disclosure may include at least some type of radiation hardening, radiation tolerance, and/or radiation compensation. Accordingly, the ADCs, DACs, SerDes, central devices, destination devices, FPGAs, ASICs, pulse generators, clock samplers, storage, variable delay circuitry, communication lines, inputs, outputs, channelizers, reconstructors, digital signal processors (DSPs), beamformers, delay elements, FIFO's, RF chain components, multiplexers, demultiplexers, and optical transceivers, may be in some examples radiation-tolerant ADCs, radiation-tolerant DACs, radiation tolerant SerDes, radiation-tolerant central devices, radiation-tolerant destination devices, radiation-tolerant FPGAs, radiation-tolerant ASICs, radiation-tolerant pulse generators, radiation-tolerant clock samplers, radiation-tolerant storage, radiation-tolerant variable delay circuitry, radiation-tolerant communication lines, radiation-tolerant inputs, radiation-tolerant outputs, radiation-tolerant channelizers, radiation-tolerant reconstructors, radiation-tolerant digital signal processors (DSPs), radiation-tolerant beamformers, radiation tolerant delay elements, radiation tolerant FIFO's, radiation tolerant RF chain components, radiation tolerant multiplexers, radiation tolerant demultiplexers, and/or radiation tolerant optical transceivers. In some examples, partial or complete triple modular redundancy (TMR) may be provided at the potential expense of additional die space or power consumption. In other examples, the use of library cells or circuit layouts having physical designs optimized to reduce the probability of SEEs may be used. By providing and integrating these elements in a single package, such as a single monolithic device, single die, multiple dies, or a hybrid device, all in a single semiconductor package, the detection of radiation induced effects may be more quickly detected and corrected or compensated for with low-latency as compared with these circuit elements and processors being provided outside of the package, such as at a different location on the board or card (wherein a package may be connected to a board, card, or other higher-level implementation). This is at least partially due to the fact that if the ADC, DAC, reconstructor, channelizer, DSP cores, beamformers, and other components which may cause detrimental system functionality in response to radiation effects are located off-package or outside of an integrated semiconductor package, radiation-effected signals and radiation correction signals must be passed through physical interfaces such as board or card connectors, solder connections, pins, and the like. This introduces significant delay and may degrade the signal to an extent that radiation effects may not be properly corrected or compensated for. In some examples, the ADCs, DACs, SerDes and other serial communications lanes, channelizers, reconstructors, beamformers, central devices, destination devices, FPGAs, ASICs, pulse generators, clock samplers, storage, variable delay element circuitry (i.e., where the delay amount of the delay element is configurable or selectable), multiplexers, communication lines, and other electrical components integrated into the single package as disclosed herein may have radiation effects such as SEEs, SEUs, SETs, SEFIs, and the like compensated by use of radiation compensation algorithms provided elsewhere on the chip, package, card, and/or board. This may in some examples include scrubbing algorithms and other radiation detection and mitigation processes provided within or outside of the semiconductor package to determine if and when radiation effects or upsets are present. These scrubbing, detection, and/or mitigation techniques may subsequently apply appropriate mitigation techniques to ensure regular system operation, recover lost data, or activate backup or cold circuits if a system element is deemed to still be functioning improperly. There may be system-level radiation tolerance or radiation hardening provided in this or other ways to ensure proper operation in the harsh radiation environment of space and high-altitude operation.

Figure 4:
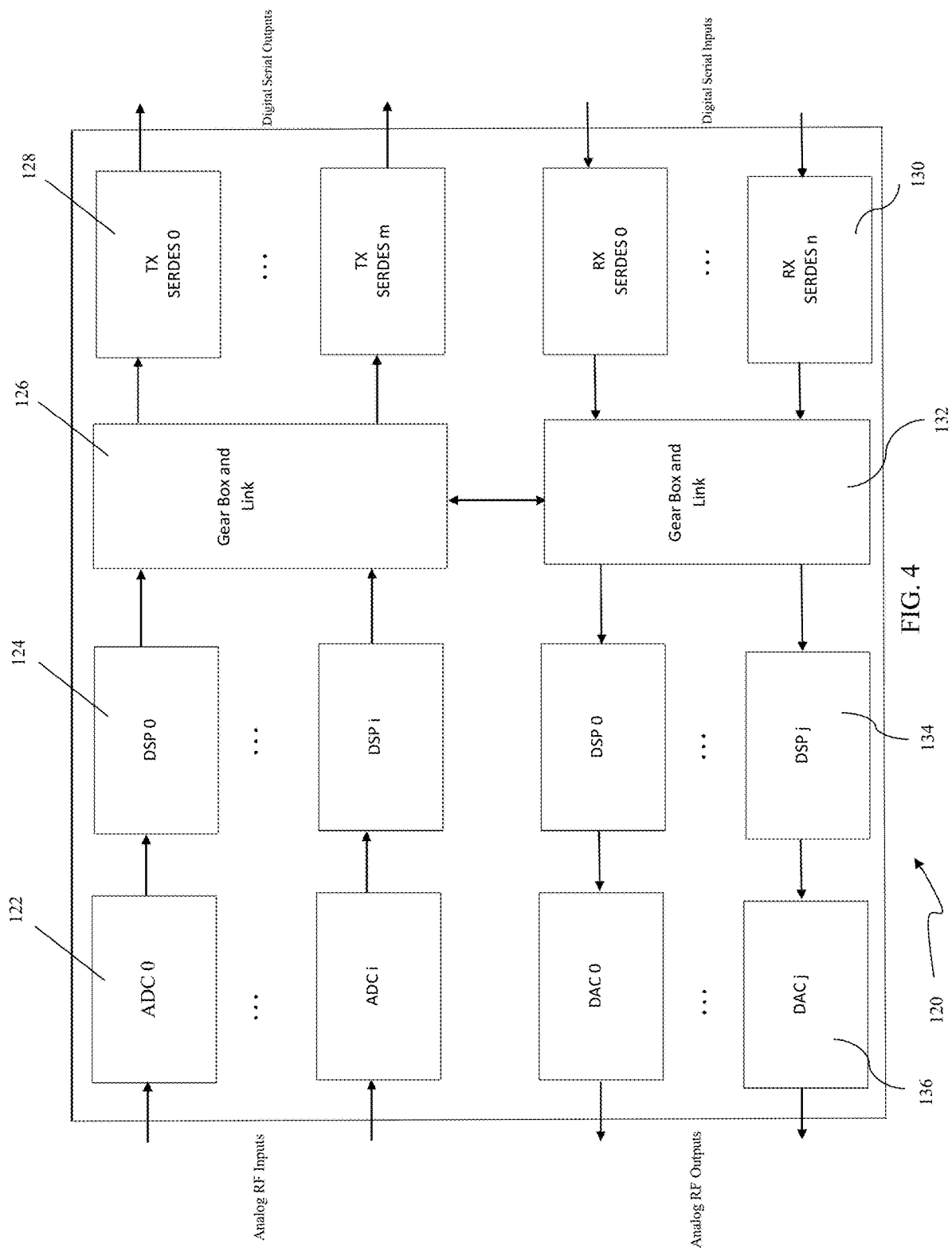
FIGS. 4-8 are different examples of manners in which the RF transceiver could be configured or used, with various components selectively powered off.

FIG. 4 shows one arrangement. In this case, an RF transceiver 120 includes a plurality of ADCs 122 that receive analog RF inputs and provide outputs to a plurality of DSPs 124. The outputs of the DSPs 124 are provided at the DSP clock rates to a Gear Box and Link 126 that matches/converts the DSP clock rate data to the serial rate of a plurality of SerDes Transmitters 128 (actually, to the aggregate serial bandwidth). The Gear Box and Link 126 also exchanges data with another Gear Box and Link 132 which receives serial data of a plurality of SerDes receivers 130 (at the serial rate). The Gear Box and Link 132 matches/converts incoming data to the DSP clock rates of a plurality of DSPs 134, which in turn provide outputs to a plurality of DACs 136. Flexible data packing (as discussed in further detail below) is implemented in the Gear Box and Link 132.

Figure 5:
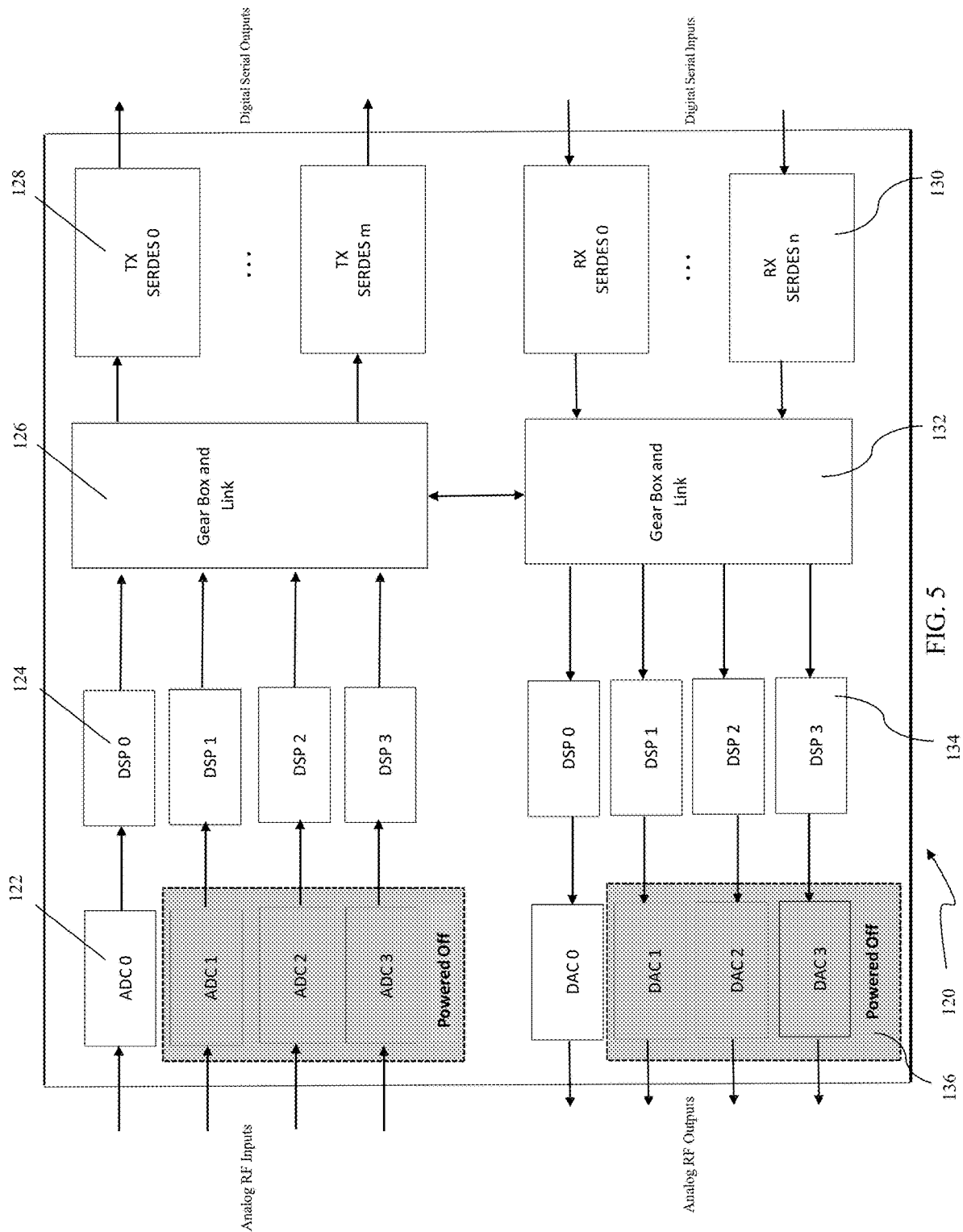
Figure 6:
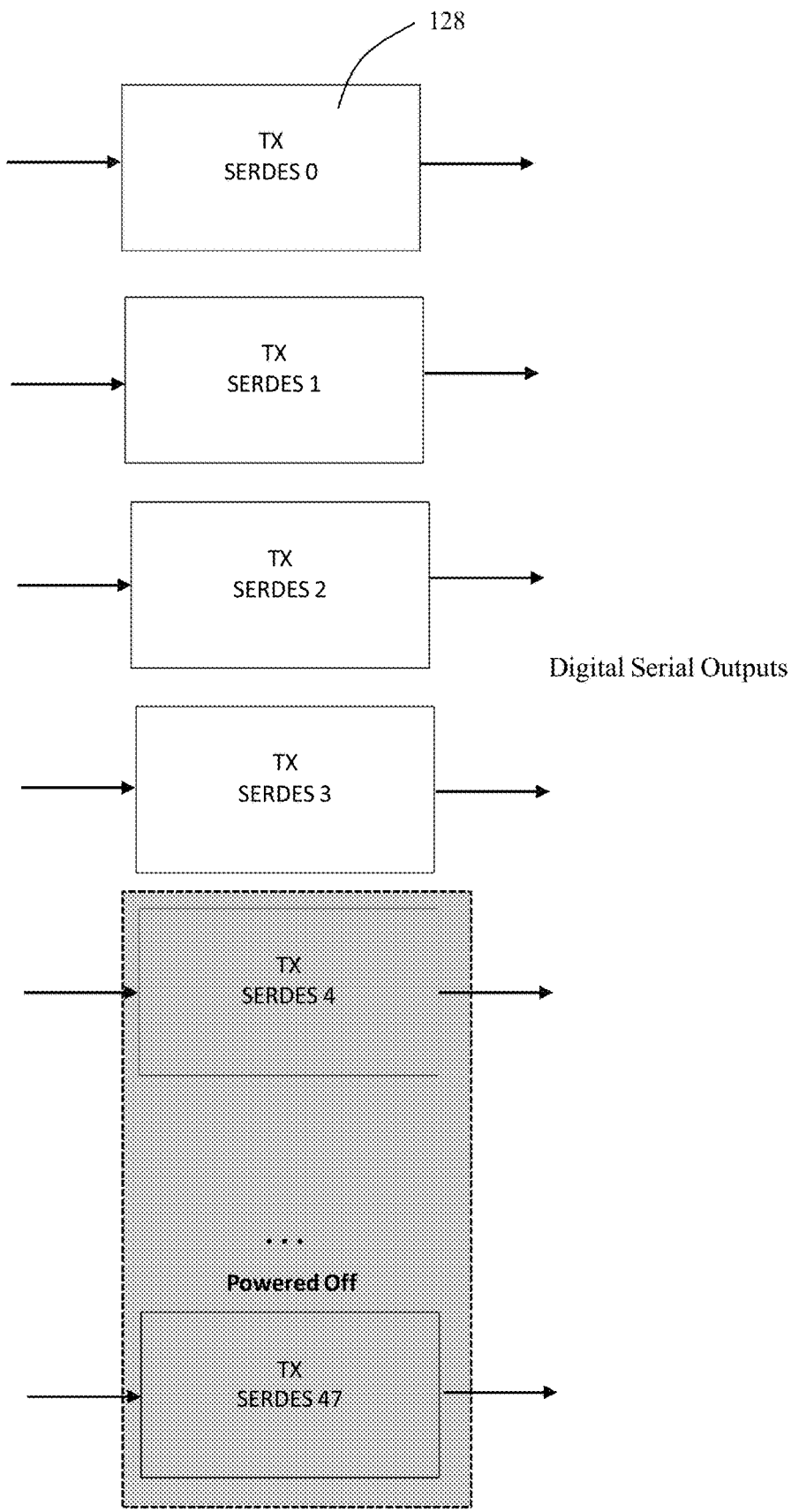
Figure 7:
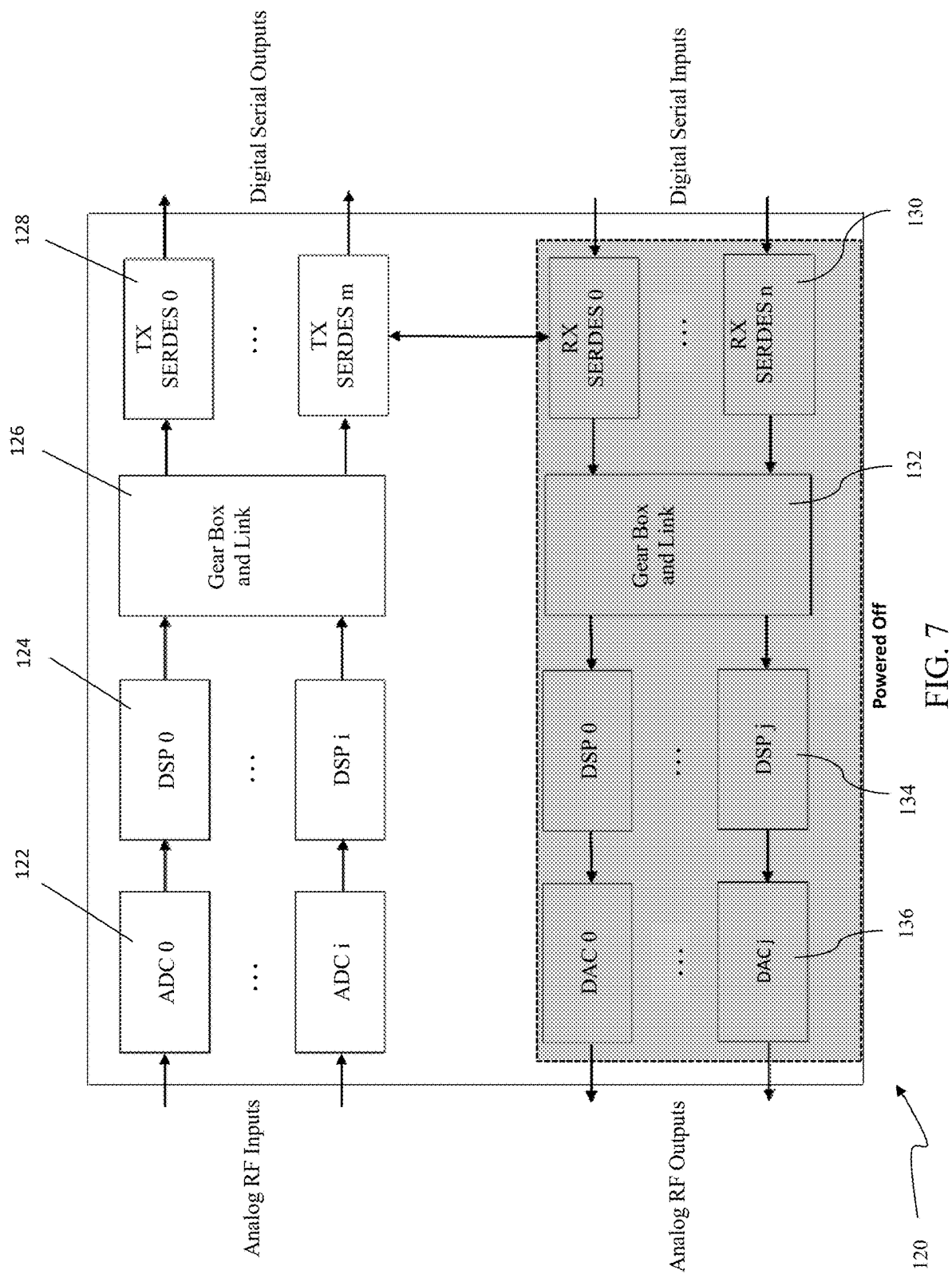
Figure 8:
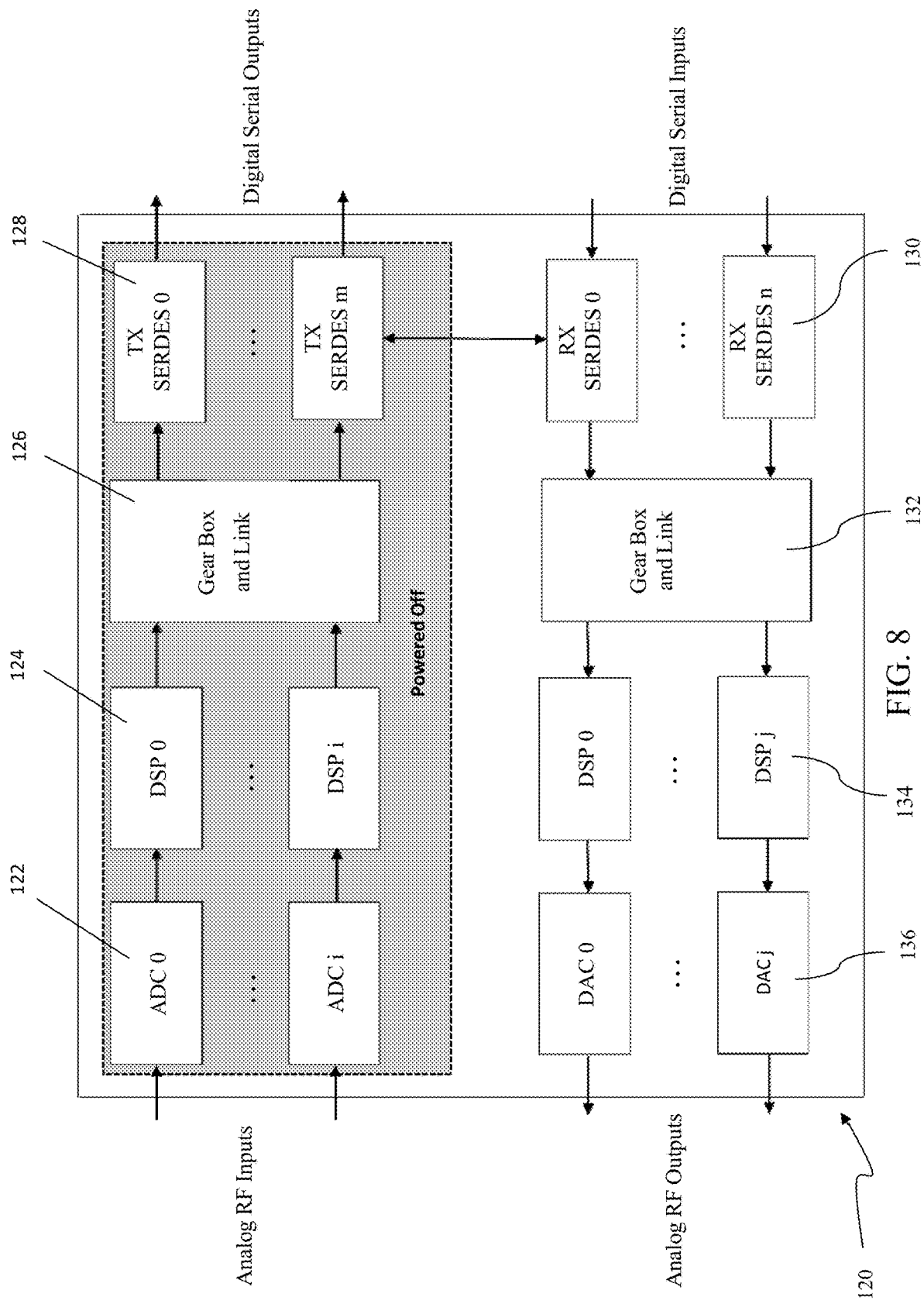

FIG. 5 shows a similar arrangement in which three of the four ADCs 122 have been powered off (or placed into a low power mode) as they were not necessary for this arrangement (because a single ADC/DAC pair can connect to the DSP processing logic). In this case, three of the four DACs 136 have also been powered off. FIG. 6 shows a portion of a similar arrangement in which all but four of the SerDes transmitters 128 have been powered off (or placed into a low power mode). FIG. 7 shows a similar arrangement in which the entire lower half (converting serial digital inputs to analog RF outputs) of the RF transceiver 120 of FIG. 5 has been powered off. FIG. 8 shows a similar arrangement in which the entire upper half (converting analog RF inputs to serial digital outputs) of the RF transceiver 120 of FIG. 5 has been powered off. As can be appreciated, many other alternative arrangements are also possible with this RF transceiver 120 and the teachings herein.

The terms signal and waveform are used herein and can be interchangeable. All frequency ranges and other numerical and quantitative values used herein are merely examples and are not intended to be limiting to the concepts described herein. The terms high speed and low speed used with regard to ADC units and DAC units are intended to differentiate between those operating at the RF frequencies at the inputs and outputs of the ADDA RF transceiver and those operating at lower frequencies internal to the ADDA RF transceiver. By way of example only, low speed ADC and DAC units may be used internally to achieve calibration, BIST, and dither functionality.

The integrated ADDA RF transceiver for satellite applications described herein may be entirely, or largely, implemented on a single monolithic silicon device. For example, it could be implemented on an ASIC, an FPGA, a modular electronic system, and the like. Alternatively, it could be implemented on a multi-chip module or on a hybrid device including active and passive integrated circuit elements.

It should be appreciated that the concepts disclosed herein could be used to implement only a portion of an ADDA RF transceiver. For example, this could include ADC units and DSP cores or it could include DSP cores and DAC units. Similarly, an ADDA RF transceiver could be designed so that portions thereof could be selectively made operational or non-operational. In this manner, an ADDA RF transceiver could have ADC units, DSP cores, and DAC units and either the ADC units or the DAC units or portions of the DSP cores (or some combination of these) could be made non-operational. This could be achieved via power islanding, clock gating, or any other suitable means. Having only portions of the ADDA RF transceiver in a design or only portions operational may be desirable from a SWaP perspective or in order to reduce IP licensing costs.

It should also be appreciated that look-up tables (LUTs) in the harsh environments experienced by satellites may tend to become corrupted over time. Suitable mitigation strategies include but are not limited to the use of Error Detection and Correction (ED&C), error detection and substitution, error detection and approximation, and background scrubbing, among others.

While various specific types of frequency synthesis have been mentioned, it should be understood that any suitable type of frequency synthesis could be used. For example, this could include free-running digital oscillation.

With regard to the configurable complex floating point data converter to conserve digital data input and output communication bandwidth, while preserving data fidelity regardless of the interpolation or decimation ratio, the complex numbers include i and q portions that share one or more bits related to the exponents thereof.

Resolution, when referring to ADCs and DACs, refers to the number of quantization levels. For instance, an 8-bit ADC would have 256 quantization levels ($2^8=256$). Precision is a less specific term relating to the quality of the converter. Despite having a high resolution, a converter may have significant imperfections degrading its precision. As an example, DNL and INL (differential non-linearity and integrated non-linearity) describe different error components imparted on the signal. The effective precision, sometimes referred to as ENOB (effective number of bits), attempts to convey this property. For instance, an 8 bit ADC might have 256 levels, but it might only have an ENOB of 6 bits. This cannot be mapped directly to an effective number of levels, but it does indicate the amount of error one might expect to be added to the signal as a side effect of the analog-to-digital or digital-to-analog conversion process.

Analog to digital converters can be calibrated using a slowly increasing ramp function. In this case, the known ramp function would be compared with the data from the ADC to determine the conversion error, which would then be saved to the calibration table for each ADC code, and for parallel ADCs, there is a table entry for each code/sub-converter combination. Many other waveforms can be used in a similar manner including but not limited to sinusoids, triangle waves, and pseudo-random noise sequences. Likewise, digital to analog converters can be calibrated in a similar way, whereby a known digital waveform is fed into the DAC, and then the DAC's output is captured by an ADC having more precision than the DAC. The difference between the expected and collected signals is calculated and stored to a calibration table. For the purposes of built-in-self-test (BIST), the intent of test signals is to maximally stimulate all functionality, logic elements and analog/mixed-signal elements, such that any defects in the as-built hardware have a high-probability of distorting observables of said stimulus signal significantly enough to be easily detectable with a high probability. Many waveforms exhibit the necessary and sufficient characteristics to support such BIST functionality, including but not limited to some but not all classes of pseudo-random noise sequence.

Applying ADC calibration includes taking each ADC output sample and using it to index into the calibration table. The calibration table either stores the error or the corrected sample at an index corresponding to the value of the corresponding ADC code. In the case that the table stores the error (which requires fewer bits and thus a smaller table), the error is added to the sample and output as the corrected (calibrated) sample. In the case that the table contains the corrected sample, the corrected sample is output directly. For DACs, the calibration table either stores a correction to apply to the digital data prior to feeding the DAC, or it stores the pre-corrected (pre-compensated) sample.

Note that it is intended for the calibration feature to not only be capable of correcting for imperfections in the ADC and DAC, but also, to correct for or partially correct for imperfections in the analog RF front-end and back-end components, outside of the ADDA. These effects include, but are not limited to, amplifier compression (IP3) and other memoryless, nearly memoryless, or partially memoryless non-linearities.

A dither signal, as it relates to digital signal processing, refers to a special waveform which is added to the signal of interest in order to reduce the spectral distribution of spurious signal energy as the signal interacts with a non-linearity. When a signal passes through a non-linearity, harmonics (copies) of the signal are spread across the spectrum. The amplitude of these copies is determined by the severity of the non-linearity. Example non-linearities include but are not limited to the quantization steps of a quantizer as found in an ADC, or the DNL or INL of an ADC or a DAC. A dither signal is designed such that after it is added to a signal, and then the signal passes through a non-linearity, the harmonics (copies) of the signal generated by the non-linearity land at time-varying locations across the spectrum and/or with time-varying phase. This prevents the harmonics from coherently summing-up as constructively as they would have without the dither, thus reducing their effective amplitude. In the parlance of the art, the harmonics (spurs) are therefore "decorrelated." The total energy of the spurs cannot be reduced, but their spectral content can be (and is) spread out across the spectrum, such that it is not as tightly concentrated in small spectral regions. In practical application, a well-designed dither signal can spread the spur energy nearly uniformly across the spectrum. Some classes of dither signal such as wide-band pseudo-random noise sequences have the unfortunate side effect of adding noise into the signal's bandwidth, thus degrading its effective SNR. Disclosed here is a method for eliminating or reducing this degradation by coherently subtracting the known dither signal from the signal after it passes through the non-linearity, thus reducing or eliminating the SNR degradation due to the dither signal. Another embodiment would place the dither signal out-of-band, such that a band-select filter, isolating the signal-of-interest, would eliminate or reduce the dither signal energy thus reducing or eliminating the associated SNR degradation.

Baseband, as referred to herein, describes a signal which is band-limited to its information bandwidth and frequency centered such that it can be decimated to its information bandwidth and remain free of aliasing. Therefore, frequency converting a signal to be centered in the third Nyquist zone could be considered converting it to baseband, since a subsequent decimation operation could result in an alias-free representation of the signal. Such a decimation operation in this case would perform a down-conversion operation translating the signal into the first Nyquist zone relative to the output sample rate, thus satisfying the above definition of "baseband".

A signal can be down-converted (frequency translated), bandwidth-limited (filtered), and down-sampled (decimated) using a single stage approach including a mixer (for down-converting via a homodyne or heterodyne approach to convert the signal to baseband or to an intermediate frequency (IF)), a filter, and a decimator. Alternatively, a signal can be downconverted in stages with coarse filtering, mixing, and decimation, such that the cascade of operations exhibits the net desired effect. Likewise, up-conversion can be implemented by analogous inverse methods. The hierarchical approach may work well for applications requiring less frequency, bandwidth, or sample rate selection resolution, and the non-hierarchical approach may work well where more selection resolution is desired. Further, the decimating and filtering functions are often performed together by a decimating filter. Similarly, the interpolating and filtering functions are often performed together by an interpolating filter.

Direct RF to digital and digital to RF conversion reduces system cost and power consumption. This reduction stems from the elimination of complexity, reducing touch labor and opportunities for mistakes, as well as reduction in parts count with the associated improvement in reliability. Power consumption is reduced by the elimination of RF mixers, which then require less amplification in the RF paths, as well as less companion circuitry such as precision frequency synthesis.

Figure 3:
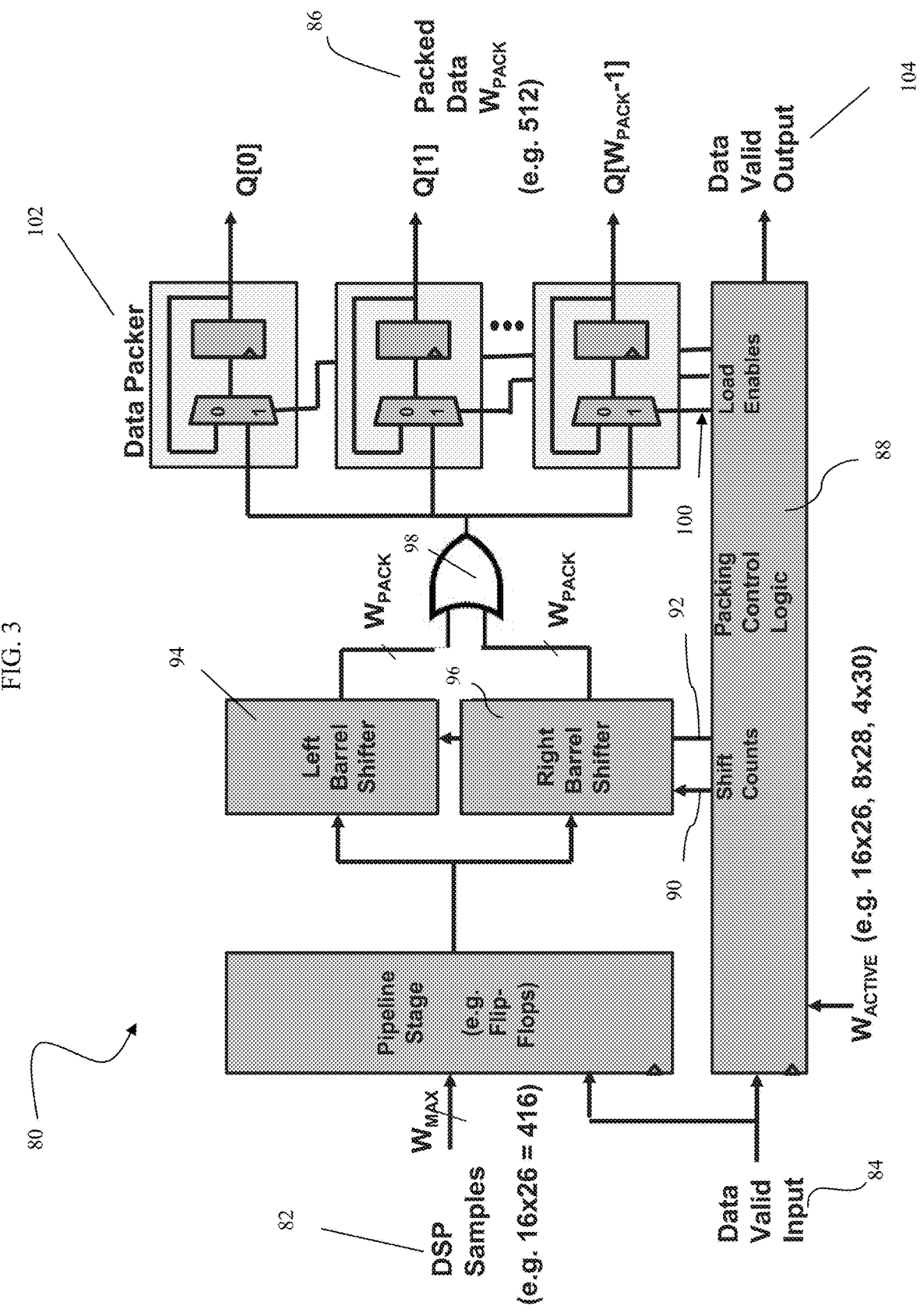
FIG. 3 is a logical schematic of flexible data packing.

Flexible data packing can be used to pack data as tightly as possible into the available digital output bandwidth. On the input side, it includes unpacking like-packed data. Both the packing and unpacking need to be flexible to account for the selectable processing bandwidths (interpolation/decimation ratios) and the configurable I/O bandwidth. FIG. 3 illustrates an example of flexible packing logic circuitry 80 which can receive DSP samples 82 in multiple widths and stacking factors, qualified by a Data Valid input 84 and pack them to a fixed block size (e.g. $W_{PACK}$=512-bits) in packed data 86 for efficient transmission over the serial (SERDES) interface.

Packing Control Logic circuitry 80 is configured to the desired DSP sample format based upon the size and stacking factor of incoming DSP samples 82. For example, in one mode of operation, 8 DSP samples of width 28-bits (14-bits Real+14-bits Imaginary) are processed. In this mode, the active width of the packing logic $W_{ACTIVE}$ is set to 224-bits. Packing Control Logic 88 keeps track of the current packing position and outputs Left Shift and Right Shift counts 90 and 92 to barrel shifters 94 and 96. The output of the barrel shifters are combined, for example, via logical OR gates 98, to handle all sample wrapping scenarios. Packing Control Logic 88 generates a Load Enable 100 for each bit position of the Data Packer 102 (e.g. 512-bits). Once a block has been completely filled, the output is qualified by setting Data Valid Output 104, and a new packing operation begins using partial samples from the previous cycle (if any) and future DSP samples.

For transmit operations, once data has been packed to a suitable block size, redundancy or Error Correction Code (ECC) symbols may be generated and combined with the data into codewords to allow the possibility of Forward Error Correction (FEC). Multiple codewords may be combined into packets which are framed by the Link Layer or Physical Coding Sublayer (PCS). The PCS layer will format the data for transmission over the SERDES interface by adapting to the SERDES parallel data interface width and clock frequency (i.e. gearbox operation) and by optionally adding channel coding and/or scrambling to the data stream, commonly using a DC-balanced code (such as 8b/10b or 64b/67b) or a pseudo-balanced code such as 64b/66b. The PCS layer may also insert other symbols into the data stream including packet or burst framing control, synchronization/channel bonding words, scrambler seeds, flow control words, idle words for clock compensation, status words, or hash codes (such as CRC) for enhanced error detection.

There are many PCS/Link layer protocols used in the industry including JESD204B, PCI Express, Ethernet, Interlaken, XAUI, Xilinx Aurora, Altera Serial Lite, or many other possibilities.

For the receive direction, the inverse sequence of operations would typically by performed, while performing lane deskew/channel bonding, error detection and reporting/correction. The receive path would remove any PCS layer and framing overhead, and ultimately return packed data blocks to flexible unpacking logic (the inverse of flexible packing logic shown in Figure X) as described above, which would ultimately return the appropriately sized samples to the DSP processing core(s).

Similar unpacking logic may be used for data received over the serial (SERDES) interface to convert packed blocks into variable sized DSP samples.

A variety of techniques and features have been disclosed herein. It should be understood that all possible combinations of these techniques and features could be used, from any one of them through all of them together.

As can be appreciated some of the advantages of the techniques and features disclosed herein are:
Replacement of RF downconverter and RF upconverter with digital technology
 Reduced power consumption compared with conventional RF
 Higher level of integration
  Less test time
  Less development cost/schedule
  More reliable
 Low phase noise digital mixer
 Efficient & high performance bandwidth selection
 Multiple bands processed from single input
  BIST to reduce cost
 Built-in digital cal (high res ADC and DAC cores built in+calibration Look Up Tables (LUTs))
  Reduces cost
  Improves SFDR
  . . . including amplifier non-linearity compensation
 Dither to improve SFDR
  At least before DAC
  In conjunction w/ADC
 Supports power savings through TDMA power gating
 Custom complex float to preserve precision versus selected bandwidth
  Flexible data packer supports above and below feature(s)
 Selectively radiation-hardened via hard flip flop and careful TMR
 Rapid BW and tune-frequency reconfiguration supports tipoff-queuing architecture for electronic warfare
 Wide instantaneous bandwidth support to reduce number of RF paths
  Reduced SWAPC, overall
 Wide sampling bandwidth and flexible filtering/decimation
  flexible ENOB (not stuck with fixed ENOB)
 Supports sub-ns or sub-us tune times (effectively reciprocal of BW). Much faster than analog tuning
 No redesign to support other RF tune frequencies or bandwidths. One size fits all from now into the future.

Figure 9:
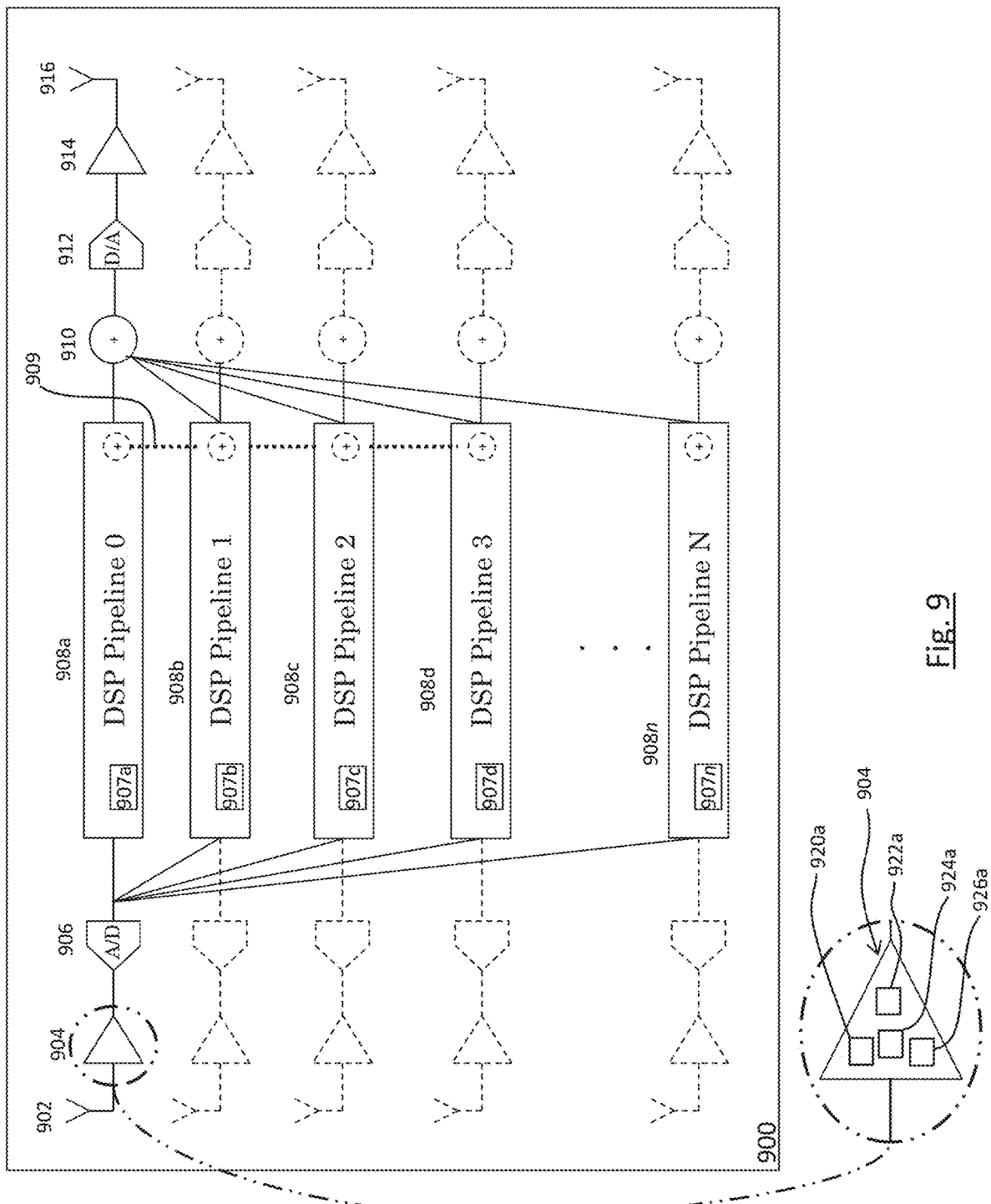
FIG. 9 illustrates a simplified view of an exemplary RF transceiver system with coherent recombination according to the present disclosure.

Turning now to FIG. 9, an RF transceiver configured to coherently recombine a high-bandwidth RF input signal will now be discussed. In some examples, high bandwidth may be defined as a bandwidth larger than the bandwidth that can be processed by a single DSP pipeline. In one non-limiting example, high bandwidth may be defined as an RF input signal greater than 2.5 GHz.

As illustrated in FIG. 9, an RF transceiver 900 includes a plurality of RF input chains 904 which receive RF input signals via antenna 902. The RF input signals are processed by the RF input chain(s) 904, which may include amplifiers 922a, baluns 924a, filters 926a, attenuators, and the like. The RF signal output from the RF input chain 904 is converted to a digital signal by the analog-to-digital converters (ADCs) 906. In the exemplary implementation of FIG. 9, the digital signal converted by the ADC 906 may subsequently be broadcasted to one or more DSP processing pipelines 908a-908n, where n is any positive integer. That is, the digital signal from the ADC 906 is provided to each of the DSP pipelines 908a-908n. Each DSP pipeline is responsible for processing a subset of the bandwidth of the RF input signal. In some examples, each DSP pipeline may include a filter to extract only a portion of the RF input signal for processing. In one non-limiting example, if an RF transceiver 900 were provided with four DSP pipelines 908a-908d then each DSP pipeline 908 would process 25% (i.e., ¼) of the RF input signal.

Figure 12:
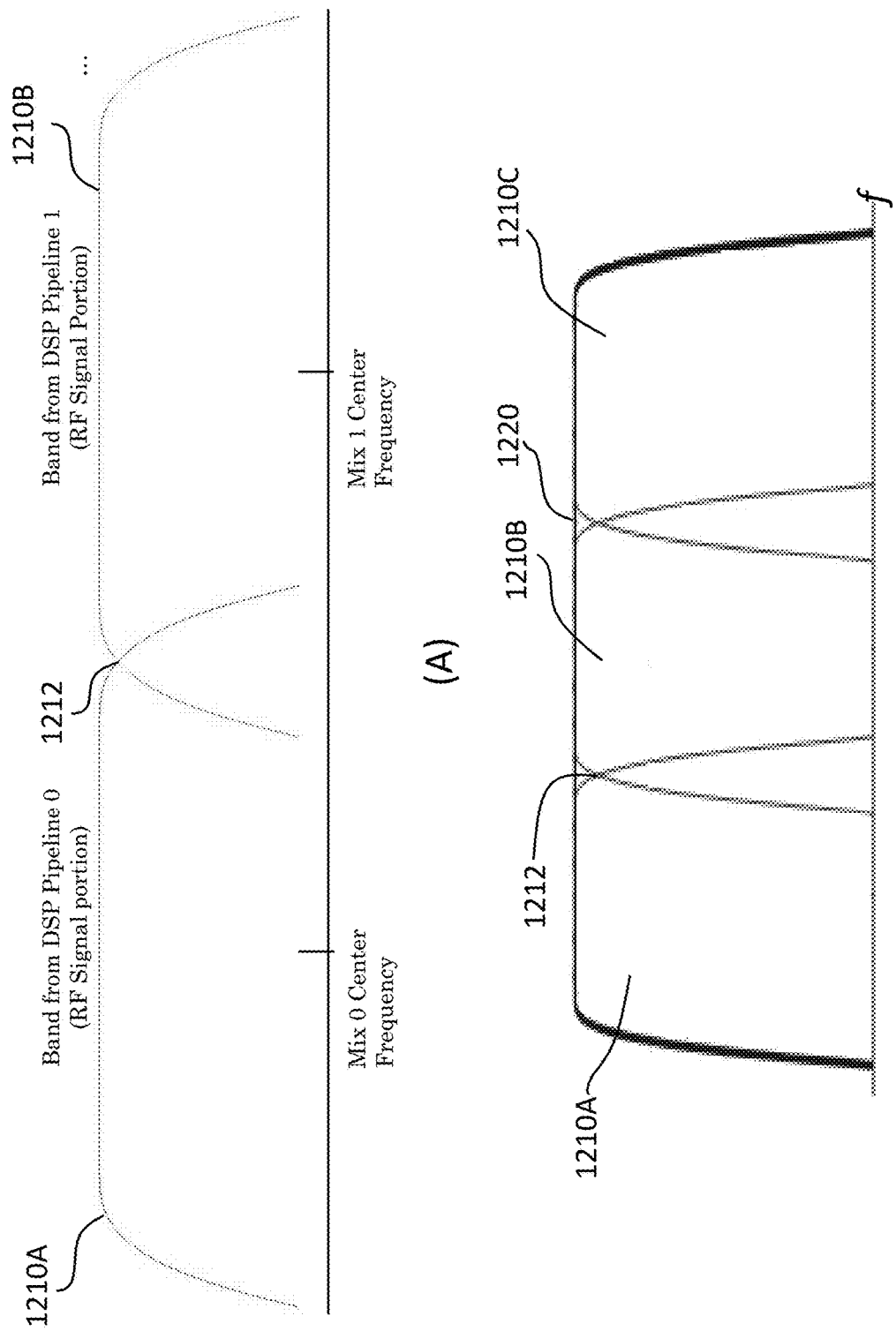
FIG. 12 illustrates exemplary signal portions and the coherently recombination of signal portions processed by DSP pipelines.

Once processed by the DSP pipelines 908a-n, the RF signal portions are subsequently recombined by an adder 910. In some examples, coherent recombination using an adder, such as a full adder, is enabled with the use of a near-perfect reconstruction channelizer 907a-907n or other channelization method provided in one or more DSP pipelines which allows for precise alignment of the −3 dB points of the adjacent channel or subchannel spectra, while matching the filter roll-off of adjacent channels or subchannels such that all points along the crossover or transition band sum to unity gain. FIG. 12 illustrates an exemplary set of spectra during and after recombination. FIG. 2A depicts a first spectra 1210A corresponding to an RF signal portion from a first DSP pipeline and a second spectra 1210B corresponding to an RF signal portion from a second DSP pipeline. The roll-offs of the adjacent spectra are matched and each point in the transition zone surrounding the crossover point 1212 sum to generate an RF output signal 1220 having a substantially flat spectrum, as illustrated in FIG. 12B. That is, by using a near-perfect reconstruction channelizer 907a-907n or similar a filter mechanism, adjacent spectra 1210A, 1210B roll-offs may overlap such that the −3dB crossover point 1212 aligns to ensure a unity gain in the adjacent subchannel filters. FIG. 12B depicts multiple subchannel spectra 1210A, 1210B, 1210C, which may correspond to RF signal portions from different DSP pipelines as described below, after coherent recombination to form a processed RF output signal 1220.

In some examples the adder 910 may be provided as a separate module, and in other examples the adder 910 may be provided in each of the DSP pipelines 908. Although FIG. 9 illustrates the RF signal portions being provided to a single adder 910, the present disclosure is not limited to this. In some examples, RF signal portions from DSP pipeline 908d may be provided to an adder (not shown) provided at the output of DSP pipeline 908c. The dashed lines 909 in FIG. 9 may represent this alternative communicative coupling of the DSP pipelines on the output side of the pipelines. The two combined RF signal portions may then be provided to an adder (shown in dashed lines) provided at the output of DSP pipeline 908b. The three combined RF signal portions may then be provided to an adder 910, which may be separate from or integrated with DSP pipeline 908a. In this way, in the example where four DSP pipelines are provided, an RF input signal may be recombined after being processed in parallel by the DSP pipelines 908a-d. The fully recombined, processed RF signal is provided to a digital-to-analog converter (DAC) 912, where it is fed to an RF output chain 914 and transmitted via transmit antenna 916 to an end user, ground station, gateway, and/or other satellite or high-altitude asset. RF output chain 914 may, like the RF input chain, comprise an amplifier, balun, and filter to prepare the RF output signal for transmission to an end user or another asset by an antenna or optical transceiver.

The recombined RF signal is coherent, which in this context means that the different RF signal portions which are processed by the various DSP pipelines 908 are recombined without phase or amplitude discontinuities. As is apparent from the layout of FIG. 9 and the description above, an RF input signal having higher bandwidth than can be processed by any one DSP pipeline may be processed by the RF transceiver 900. If there are n DSP pipelines 908, then each DSP pipeline may process $1/n^{th}$ of the total bandwidth of the input signal. In one non-limiting example, DSP pipelines 908 may be capable of processing bandwidths of 2.5 GHz each, but the RF input signal received by antenna 902 may have a bandwidth of 10 GHz. As discussed above, the RF transceiver 900 may be configured to broadcast the RF input signal to one or more DSP pipelines 908 such that each DSP pipeline 908 processes a portion of the 10 GHz bandwidth signal. In this example, four DSP pipelines 908 would be needed to be able to process the full 10 GHz bandwidth RF input signal and output a coherent RF output signal. To process a 20 GHz bandwidth RF input signal with the same processing bandwidth of 2.5 GHz per DSP pipeline, more DSP pipelines may be provided (e.g., eight DSP pipelines), or a RF transceiver may be configured to optionally allow transmission of a broadcast signal to another RF transceiver chip for processing by DSP pipelines on the other RF transceiver chip (e.g., by communication signal lines 1151a, 1151b in FIG. 11). By processing portions of the bandwidth in parallel using one or more DSP pipelines, the RF transceiver 900 in this implementation can process a larger coherent bandwidth than would be possible if the RF transceiver were to process the RF input signal from each RF input chain with a single DSP pipeline.

By using a single RF input chain 904, the RF transceiver 900 eliminates the need to correct and compensate for the signal response variations of more than one RF input chain. In particular, components such as the amplifier 922a, balun 924a, filters 926a, printed circuit board (PCB) trace characteristics, and the like, all have specific signal response characteristics that have to be compensated for or otherwise corrected before processing by the processing chain (e.g., a DSP pipeline). For example, amplifiers 922a, filters 924a, baluns 926a, and PCB traces may all introduce phase distortion and/or discontinuity, amplitude distortion and/or discontinuity, and/or group delay mismatch. Amplifiers may introduce nonlinearities such as AM/AM and AM/PM effects and capacitor-related nonlinearities, and the ADC and DAC modules may have amplitude, phase, and frequency response characteristics which vary between individual components. Accordingly, by using a single RF input chain and a single ADC, as discussed above with respect to FIG. 9, the DSP pipelines 908 are able to compensate for and correct these response characteristics more efficiently and effectively, with lower power consumption, and with fewer distortions than when more than one RF input chain and/or more than one ADC is used. Similar advantages are gained by passing the RF output signal being through one DAC and one RE output chain.

For example, if one RF input chain and one ADC were used to provide the RF input signal each of the DSP pipelines, as discussed in the example of FIG. 9, then there are conceivably four sources of signal response variations which need to be equalized or otherwise compensated for by the DSP pipeline. For each additional RF input chain and ADC, the number of signal degradation sources which need to be compensated grows by four. In an exemplary system with four RF input chains 904 and four ADCs 906 processing RF input signals or portions of RF input signals, there could be sixteen different sources of phase and amplitude distortion/discontinuity, delay mismatch, nonlinearities, and amplitude, phase, and frequency response characteristics which would need to be equalized or otherwise compensated for by four different DSP pipelines. This task would at a minimum require significant processing power, but likely would result in significant data loss and/or signal degradation, and would require additional error correction processing to recover the lost data—if recovery of the signal were possible.

It is noted that the RF transceiver 900 may selectively be configured to operate with multiple RF antennas 902, RF input chains 904, ADCs 906, DSP pipelines 908, DACs 912, RF output chains 914, and transmit antennas 916. In this implementation, the RF transceiver 900 may operate as discussed with respect to the system of FIGS. 1-8 above. In FIG. 9 (and FIG. 11 in the discussion below), these components are depicted with dashed lines to indicate that in the example discussed above they are not in use when a large-bandwidth RF input signal is being processed in accordance with the present discussion. Furthermore, the RF transceiver 900 (and similarly the RF transceiver chips or packages 1101-1103 in FIG. 11) may be configured to operate in a hybrid mode where, for example, two DSP pipelines 908 are used to process an RF input signal with a bandwidth greater than the processing bandwidth of the DSP pipelines 908, while the remainder of the DSP pipelines 908 process RF input signals from dedicated RF input chains 904 and ADCs 906. Accordingly, in the example where DSP pipelines 908 can process a 2.5 GHz bandwidth signal per pipeline, the RF transceiver 900 may be configured to process a 5 GHz RF input signal broadcasted over two DSP pipelines 908a-908b (each handing 2.5 GHz bandwidth), while DSP pipelines 908c, 908d process distinct RF input signals received by antenna or optical transceivers 902 provided in the signal chain for DSP pipelines 908c, 908d, respectively. The system of FIG. 11 may be configured to operate in similar hybrid mode, mutatis mutandis.

Although in the example of FIG. 9 the transceiver 900 is described as receiving an RF input signal, the present disclosure is not limited to this. Alternatively, an optical transceiver may be used in place of the antenna 902. This optical transceiver (not shown) may be operable to convert an optical signal such as a pulsed laser signal into an analog RF representation of the optical input signal. The coherent aperture combining discussed herein offers significant advantages over the use of a single large aperture (expensive) as used today. State-of-the-art optical receivers are operating near the quantum limit of the optical transceiver's performance. By scaling the aperture using many small telescopes and combining each of the optical signals by using digital signal processing, the system can create a large effective aperture which may reduce or eliminate the need for expensive adaptive optics.

As technology advances, bandwidth demands on satellite communications and other RF and RF-over-optical satellite payloads are steadily increasing. In order to keep up with this increased demand, it is important to provide flexible RF and optical transceiver systems which can handle the increased bandwidth demands while maintaining flexibility to work with both large and small bandwidth RF signals (e.g., smaller channel bandwidths) and be configurable to perform other user requirements such as beamforming. The RF transceiver as disclosed herein is capable of this flexibility while keeping power consumption low and radiation tolerance high as discussed above with respect to FIGS. 1-8.

Figure 10:
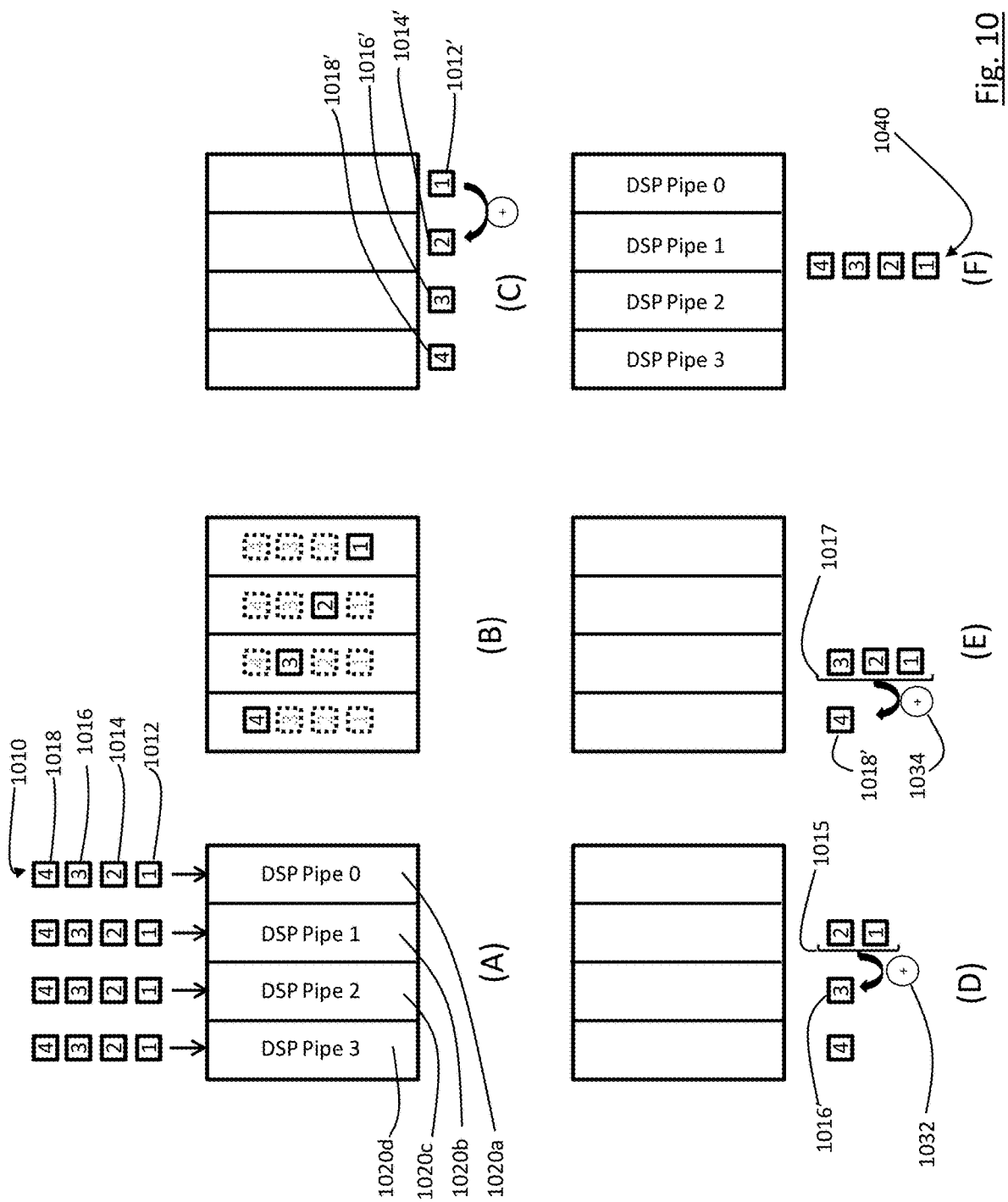
FIG. 10 illustrates a conceptual overview of the RF transceiver system with coherent recombination of FIG. 9.

With reference to FIG. 10, a conceptual overview of coherent recombination of a high-bandwidth signal according to the present disclosure will now be discussed. FIG. 10 depicts a simplified flow of a high-bandwidth signal 1010 through a plurality of DSP pipelines 1020a-1020d. As discussed above with respect to FIG. 9, the signal 1010 (which may correspond to an RF input signal from an optical or RF transmission signal), may be processed by an input RF chain, converted to a digital signal by an ADC, and then broadcasted or otherwise distributed to a plurality of DSP processing pipelines for processing.

In the example of FIG. 10, four DSP pipelines 1020a, 1020b, 1020c, 1020d are provided. In FIG. 10A, input signal 1010 is broadcast to each of the four DSP pipelines 1020. To simplify the discussion, input signal 1010 may comprise four signal portions 1012, 1014, 1016, and 1018. In some examples these signal portions 1012, 1014, 1016, and 1018 may represent bits, bytes, words, frames, superframes, combinations of these data structures, and the like. Each DSP pipeline 1020a-1020d receives the same data which has been converted to a digital representation of the input signal by an ADC (not shown).

In FIG. 10B, DSP pipeline 1020a selects signal portion 1012, DSP pipeline 1020b selects signal portion 1014, DSP pipeline 1020c selects signal portion 1016, and DSP pipeline 1020d selection signal portion 1018. As discussed previously, this may be performed using a near-perfect reconstructing channelizer and the like. The selection of various signal portions may be performed by filtering, mixing, tuning, and other like methods of choosing a smaller portion of a larger signal for further processing. The DSP pipelines 1020a-d may perform their intended processing on the signal portions 1012, 1014, 1016, 1018, respectively, which may include any subset or combination of the DSP feature list previously discussed above with respect to FIGS. 1-8, such as decimating, interpolating, synthesizing, equalizing, channelizing, reconstructing, and/or beamforming. As noted in the discussion of FIG. 9, the equalization processing performed by DSP pipelines 1020a-d may be drastically simplified and may result in more accurate equalization as a result of the input data stream 1010 having been passed through one RF input chain and one ADC, and the RF output signal being passed through one DAC and one RF output chain.

Once the DSP pipelines 1020a-d complete their processing of the signal portions 1012, 1014, 1016, 1018, respectively, the processed signal portions 1012', 1014', 1016', 1018' are coherently recombined to form a processed data stream 1040. That is, in FIG. 10C signal portion 1012' is added or summed at 1030 with signal portion 1014' to form signal portion 1015 consisting of signal portions 1012', 1014' placed with coherent phase and amplitude (e.g., in adjacent subchannels or channels as discussed above) based on the original input signal 1010. In FIG. 10D signal portion 1015 is added or summed at 1032 with signal portion 1016' to form signal portion 1017 consisting of signal portions 1012', 1014', and 1016' coherently combined or recombined based on the original input signal 1010. In FIG. 10E the signal portion 1017 is added or summed at 1034 with signal portion 1018' to form processed output signal 1040 consisting of processed signal portions 1012', 1014', 1016', 1018' coherently placed as input signal 1010. Accordingly, the input signal 1010 is processed in parallel by DSP pipelines 1020a-d and subsequently coherently recombined to output a processed signal 1040.

As discussed in the example of FIG. 9, the adding or summing at 1030, 1032, 1034 of signal portions 1012', 1014', 1016', 1018' may be performed by an adder provided in the DSP pipeline 1020a, 1020b, 1020c, 10120d, respectively. The adders may be communicatively coupled to each other by a PCB trace or other suitable transmission element. In other examples, an adder may be provided external to the DSP pipelines 1020a-d and communicatively coupled to each of the DSP pipeline 1020 outputs and configured to coherently recombine the respective signal portions 1012-1018 to form a processed output signal 1040. In another example, the processed signal portions 1012', 1014', 1016', 1018' may be transferred between the respective DSP pipelines 1020 and then added by an adder provided in one of the DSP pipelines or an adder provided external to the DSP pipeline (i.e., signal portions 1014', 1016', 1018' may be sequentially transmitted from DSP pipeline 1020d to 1020c to 1020b and then to DSP pipeline 1020a, where they are added in pipeline 1020a or are output to an adder for coherent recombination). This coherent recombination may also be referred to as daisy-chaining of the DSP outputs, since in one example the output of DSP pipeline 1020a is added to the output of DSP pipeline 1020b, which is added to the output of DSP pipeline 1020c, and so on.

Similar to the example of FIG. 9 discussed above, the concept illustrated of FIG. 10 represents the processing of a high-bandwidth signal through a system which would otherwise be limited by the bandwidth of a single DSP pipeline. For example, if each DSP pipeline 1020 were capable of processing a bandwidth of 2.5 GHz then the system of FIG. 10 would be able to process an input data stream 1010 having a bandwidth of 10 GHz (i.e., 2.5 GHz over four DSP pipelines 1020) while only utilizing a single RF input chain, single ADC, single DAC, and single RF output chain. As previously discussed, this would have the added advantage of introducing only one set of signal response characteristics which must be compensated and corrected for (as opposed to a system where each DSP pipeline input is received through a separate RF input chain, RF output chain, ADC, and/or DAC).

Although the example of FIG. 10 depicts four DSP pipelines 1020a-1020d, the present disclosure is not limited to this. More or fewer DSP pipelines 1020 may be provided while still remaining within the scope of the invention. While the above discussion has been directed to broadcasting a signal to respective DSP pipelines which then process portions of the signal, the present disclosure is not limited to this. Instead of broadcasting the same signal to each DSP pipeline, RF signal portions may be selected after conversion to digital signals by the ADC and the RF signal portions may be separately routed or otherwise distributed to respective DSP pipelines for processing and subsequent coherent recombination.

Figure 11:
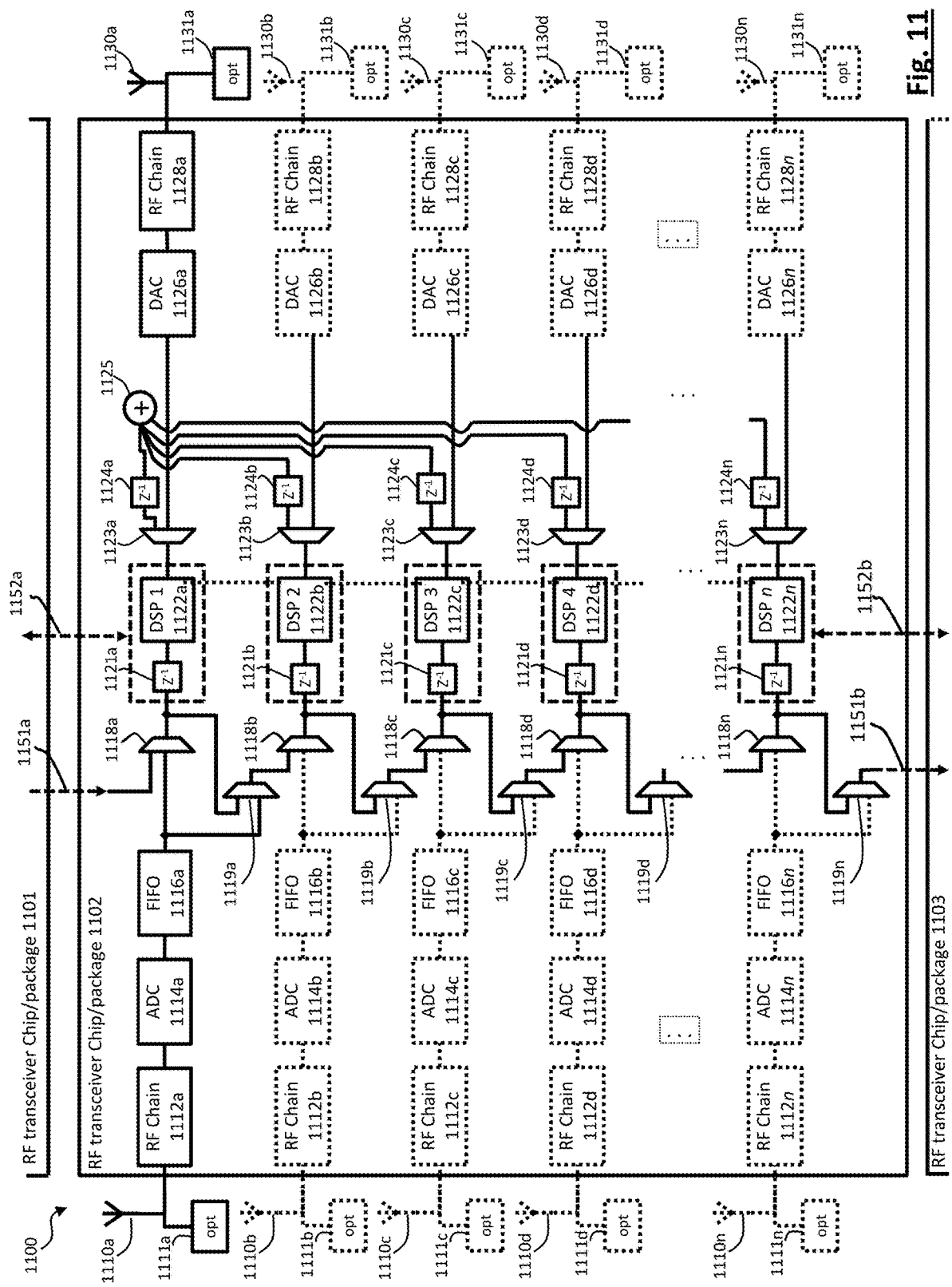
FIG. 11 illustrates an exemplary RF transceiver system with coherent recombination according to the present disclosure.

FIG. 11 illustrates block diagram of an example of an RF transceiver system 1100 configured for coherent recombination of a high-bandwidth input signal similar to the RF transceivers discussed above with respect to FIGS. 8 and 9. The RF transceiver system 1100 may include one or more RF transceiver chips or packages 1101, 1102, 1103, etc. For simplification of the present discussion, RF transceivers will be referred to as RF chips 1101, 1102, 1103, but it is noted that similar to the discussion of RF transceivers in FIGS. 1-8, these components may be provided on a single monolithic silicon device, one or more die or a multi-chip module all in the same semiconductor package, a modular electronic system, and/or a hybrid device having active and passive components in a single semiconductor package.

The system 1100 may include one or more signal reception modules, which may be RF antenna 1110a-1110n or optical transceivers 1111a-1111n (where n is a positive whole integer). An RF transceiver chip 1102 may include one or more RF input chains 1112a-1112n communicatively coupled to one or more ADCs 1114a-1114n for converting the analog RF signal to a digitally sampled RF signal. The ADCs 1114a-1114n may optionally provide the digitally sampled RF signal to one or more first-in first-out (FIFO) modules 1116a-1116n, if FIFO modules are provided. Since ADCs 1114 can process portions of the input signal at different rates, the FIFO 1114a can ensure that the signal is output to the DSP pipelines 1122 in the proper order and that the signal portions are not provided to DSP pipelines at different times. However, FIFO 1114a may optionally be excluded from the system.

Similar to the discussion above with respect FIGS. 9 and 10, the RF transceiver chip 1102 may operate in one of a plurality of modes. When the RF transceiver chip 1102 is configured for processing multiple RF input signals having bandwidths suitable for being processed by a single DSP pipeline 1122, then one or more RF input chains 1112a-1112n and RF output chains 1128a-1128n may be utilized in combination with the RF antenna 1110a-1110n or optical transceivers 1111a-1111n to receive, process, and transmit the RF signals. This operation may be similar to the mode of operation described with respect to FIGS. 1-8 where each DSP pipeline 1122 receives a signal from a dedicated RF input chain 1112, ADC 1114, FIFO 1116 and outputs the processed signal to a dedicated DAC 1126, RF output chain 1128, and transmits the processed signal by one or more antennas 1130 or optical transceivers 1130.

When a RF signal has a higher bandwidth than can be processed by a single DSP pipeline 1122, an RF signal may be distributed to DSP pipelines 1122b, 1122c, 1122c . . . 1122n. There may be multiple ways to broadcast the RF input signal to the DSP pipelines 1122 for processing of the RF signal. An RF input signal received by antenna 1110a or optical transceiver 1111a may be processed by the RF chain 1112a and converted to a digitally sampled signal by ADC 1114a. The digitally sampled signal is transmitted through FIFO 1116a and provided to both multiplexer 1118a and multiplexer 1119a. Multiplexer 1118a provides the signal to DSP pipeline 1122a, and multiplexer 1119a may be selectively configured to provide the signal to multiplexer 1118b. Multiplexer 1118b may provide the RF signal to both DSP pipeline 1122b as well as multiplexer 1119b. At multiplexer 1119b, the RF signal is provided to multiplexer 1118c, which in turn provides the RF signal to DSP pipeline 1122c as well as multiplexer 1119c. Similarly, the multiplexer 1119c may provide the RF signal to multiplexer 1118d, which in turn provides the RF signal to DSP pipeline 1122d as well as multiplexer 1119d. This transmission of the RF signal through the system 1100 may similarly proceed until the RF input signal has been broadcasted to all DSP pipelines 1122a-1122n. The system of multiplexers 1118, 1119, 1123 and signal traces between multiplexers 1118, 1119, 1123, and(when provided outside of the DSP core(s)) the delay elements 1121 and 1124 may be referred to as a distribution network over which digitized or sampled RF input signals and digitized RF output signals may be communicated to other parts of the RF transceiver system 1100.

Alternatively or in addition to the signal routing algorithm discussed above using multiplexers 1118a-1118n and 1119a-1119n, if there are multiple RF transceiver chips 1101, 1102, 1103 provided, an RF signal may be transmitted between RF transceiver chips in order to distribute processing of the RF signal among the RF transceiver chips 1101-1103. For example, an RF signal may be transmitted via signal line 1151a from RF transceiver chip 1101 to the multiplexer 1118a of RF transceiver chip 1102. The RF signal may then be distributed to DSP pipelines 1122a-1122n in a similar way discussed above. If another RF transceiver chip is desired for use, such as RF transceiver 1103, then at multiplexer 1119n the RF signal may be transmitted via 1151b to RF transceiver chip 1103 for additional broadcasting and processing of the signal. Although three RF transceiver chips 1101, 1102, 1103 are illustrated, it is within the scope of the present discussion to include more or fewer than three RF transceiver chips. Signal lines 1151a, 1151b may in some examples be serializer/deserializer (SerDes) lanes, PCB traces, parallel signal lines, and the like.

Once the RF input signal has been broadcasted to the DSP pipelines 1122a-1122n, portions of the RF signal may be selected for further processing in accordance with the discussion of FIGS. 8 and 9 above. In this way, a high-bandwidth RF input signal (e.g., one with a larger bandwidth than a single DSP pipeline 1122 can process) may be distributed among a plurality of DSP pipelines 1122 for additional processing. For example, similar to the discussion above, if an RF input signal has a 20 GHz bandwidth but each DSP pipeline 1122 can process up to 5 GHz bandwidth, then the RF signal may be distributed to DSP pipelines 1122a, 1122b, 1122c, and 1122d, with each pipeline processing a 5 GHz bandwidth portion of the 20 GHz signal. The RF transceiver system 1100 may be configurable to operate in a hybrid mode where a subset of available DSP pipelines 1122 are utilized to process a high-bandwidth RF input signal, while other DSP pipelines 1122 receive and process independent RF input signals from separate RF antenna or optical transceivers, RF input chains, ADCs, and output over independent RF output chains. Similarly, in some examples, portions of RF input signal bandwidth may be processed by DSP pipelines provided on separate RF transceiver chips 1101, 1103.

In some examples, delay elements 1121a-1121n may be provided between multiplexers 1118a-1118n and DSP pipelines 1122a-1122n. Delay elements 1121a may be a one or more configurable registers, but can be any circuit element capable of selectively and configurably delaying, by a delay amount, the routing and delivery time of an RF signal to another RF transceiver element. In order to ensure coherent recombination of the RF signal portions processed by the DSP pipelines 1122a-1122n, delay elements 1121a may be provided to accommodate for the different transmission latencies of the broadcasted RF input signal to the DSP pipelines 1122. That is, the broadcasted RF input signal may take a finite amount of time to be transmitted to the various DSP pipelines 1122 as a result of the various signal trace lengths and multiplexers the signal must be transmitted over.

Accordingly, delay element 1121a may delay the delivery of the broadcasted RF signal to DSP pipeline 1122a by an amount of time commensurate with the time needed for the RF signal to propagate over the signal traces between multiplexers 1119a-1119n and 1118b-1118n, and any potential delay the multiplexers 1119a-1119n and 1118b-1118n may introduce. Similarly, delay element 1121b may delay the delivery of the broadcasted RF signal to DSP pipeline 1122b by an amount of time commensurate with the transit time of the RF signal over the signal traces between multiplexers 1119b-1119n and 1118c-1118n as well as transit time over signal traces between multiplexers 1119b-1119n and 1118c-1118n, including any potential delay the multiplexers 1119b-1119n and 1118c-1118n may introduce. Delay elements 1121c, 1121d . . . 1121n may similarly delay the delivery of the broadcasted RF signal to the respective DSP pipelines 1122c-1122n by amount of time required to be transmitted over signal traces between the appropriate multiplexers 1119 and 1118, and any time delays caused by the multiplexers 1119, 1118. In this way the broadcasted RF signal may be provided to and processed by the DSP pipelines 1122a-1122n at substantially the same time. By ensuring the alignment of the broadcasted RF input signal (e.g., provided at substantially the same time or otherwise temporally aligned) at the input side of DSP pipelines 1122, the processing and subsequent recombination of the RF signal portions (discussed below) can be more easily and efficiently performed. Further, by aligning the arrival time of the broadcast RF signal at the DSP pipelines 1122 using delay elements 1121, beamforming of the RF signal and/or RF signal portions can be performed by the RF transceiver chip 1102 or by a different RF transceiver chip 1101, 1103, etc., if desired.

Figure 13:
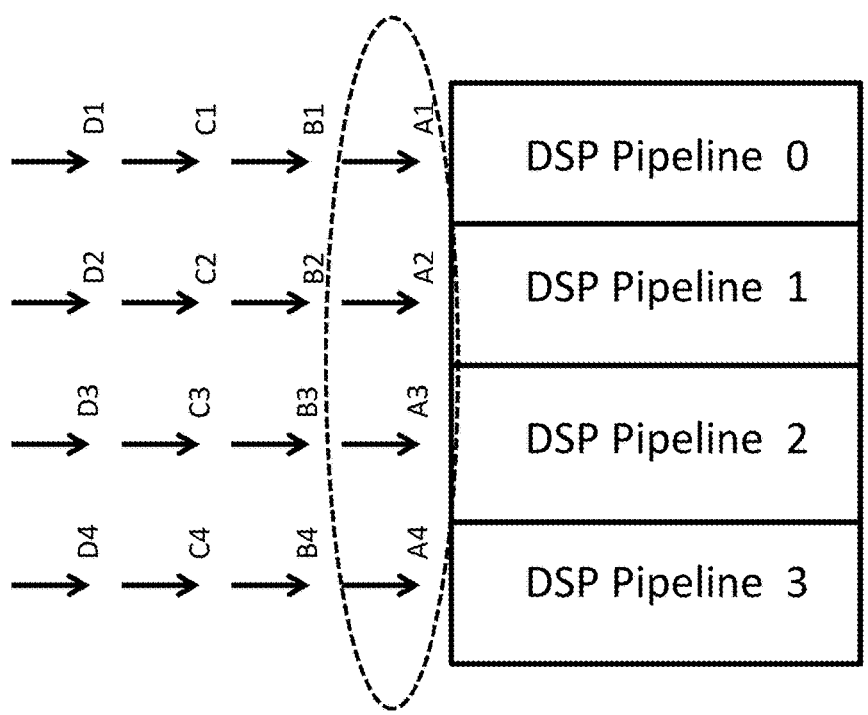
FIG. 13 illustrates temporal arrangement of signal portions in a system with and without delay elements as presently disclosed.
Figure 13:
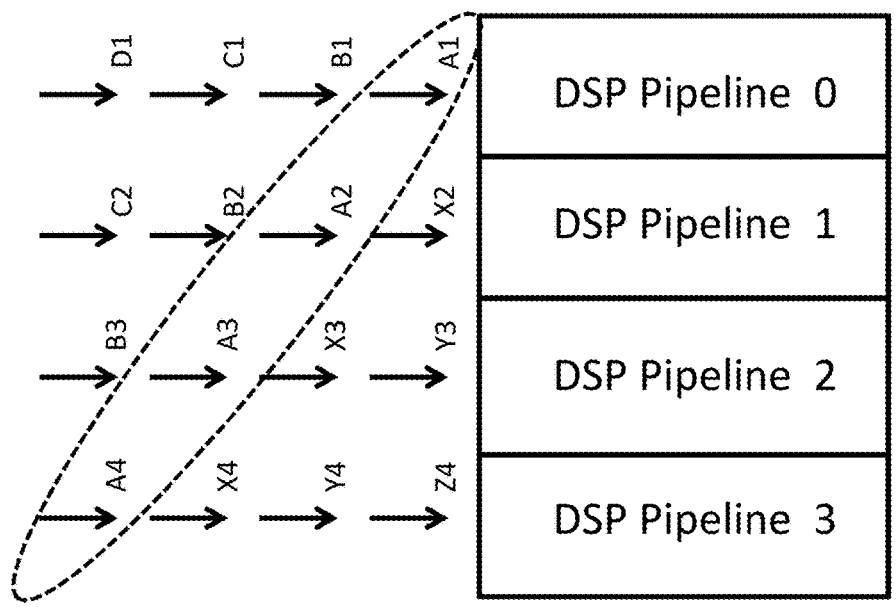

FIG. 13 illustrates the use of delay elements, such as delay elements 1121a-1121n, to ensure alignment of the broadcasted RF input signal. In FIG. 13A-13B, A1-A4, X2-X4, Y3-Y4, Z4, etc. represent the same RF signal portion of an RF input signal A, X, Y, Z, respectively, as communicated over various aspects of the distribution network (i.e., multiplexers and signal traces). As illustrated in FIG. 13A, a system without delay elements would provide RF input signal A to DSP pipelines 0-4 at different times based on signal trace length and multiplexer processing latencies, as described above. In this simplified example, RF signal portions X2, Y3, Z4 may be portions of an RF input signal for the same end user, or may be different RF input signals altogether. By contrast, FIG. 13B illustrates an RF transceiver system having delay elements such as the system of FIG. 11 discussed above. FIG. 13B illustrates how a digitized RF input signal A may be provided to the DSP pipelines 0-3 at substantially the same time in order to ease the route timing of the signals. That is, by delaying delivery of A1 to DSP pipeline 0 by an amount of time required for A4 to be communicated to DSP pipeline 3, A3 to be communicated to DSP pipeline 2, and/or A2 to be communicated to DSP pipeline 1, the RF input signal A may be provided to the DSP pipelines 0-3 at substantially the same time as discussed above with respect to FIG. 11. Similarly, delivery of A2 may be delayed by an amount of time commensurate for delivery of A3 to DSP pipeline 2, and A4 to DSP pipeline 3, and delivery of A3 may be delayed by the amount of time commensurate for delivery of A4 to DSP pipeline 3.

However, although FIG. 13 may imply the use of delay elements in the distribution network (i.e., signal traces and multiplexers coupling the DSP pipelines with ADCs, DACs, FIFOs, etc.) for aligning the digitized RF input signal delivery to the DSP pipelines, the delay elements may be provided in the DSP pipelines themselves and configured to align the digitized RF input signal in the manner depicted in FIG. 13 to ease route timing in the system. Accordingly, FIG. 13 illustrates a simplified view of delivering a digitized RF input signal to multiple DSP pipelines at once, but is not intended to limit the scope of the present disclosure to include delay elements provided in a distribution network, as they may alternatively or additionally be provided in respective DSP pipelines.

However, if the broadcasted RF signal is not provided at the DSP pipelines 1122a-1122n at substantially the same time (e.g., if delay elements 1121 are not provided, or the amount of delay provided by delay elements 1121 is inaccurate or insufficient to properly align the broadcasted RF signal at the DSP pipelines due to error), and beamforming is not desired, then temporal re-alignment of the RF signal portions or processed RF signal portions (discussed below) can be performed by delay elements 1124a-1124n which are provided on the output side of the DSP pipelines 1122a-1122n.

Once the DSP pipelines 1122a-1122n perform the desired processing of the RF signal, which may include one or more of the DSP processing steps discussed above with respect to the DSP Feature List, the RF signal portions are provided to multiplexers 1123a-1123n respectively. It is noted that in this example different portions of the RF input signal are processed by the various DSP pipelines 1122 similar to the discussion above with respect to FIGS. 9-10. Once the DSP pipelines have processed their respective RF signal portions, the processed RF signal portions are recombined by an adder 1125, which may be a full adder circuit module or other circuit element capable of recombining or reconstructing multiple signal portions into a coherent output signal containing the full spectrum and bandwidth of the input signal. In some examples the adder 1125 may be a separate circuit module which receives the processed RF signal portions from the DSP pipelines 1122 and adds the different processed RF signal portions to generate a processed RF output signal. This recombination of the processed RF signal portions is performed based on the RF input signal, such that the processed RF signal portions are recombined in the same order as the RF input signal. Accordingly, the processed RF signal portions are coherently recombined to form the RF output signal.

In some examples, there may be multiplexers 1123a-1123n provided in order to selectively route the processed RF output portions to the adder 1125 or, in a low-bandwidth processing operation, directly to DACs 1126a-1126n and RF output chains 1128a-1128n for transmission by antenna 1130a-1130n or optical transceivers 1131a-1131n. Delay elements 1124a-1124n may be optionally provided between multiplexers 1123a-1123n in order to ensure that the adder 1125 receives the processed RF signal portions with the correct timing in order to coherently recombine the processed RF signal portions into the RF output signal. Delay elements 1124a-1124n, similar to delay elements 1121a-1121n, may be configured to variably delay the RF signal portions to compensate for transmission latency introduced by the signal traces between multiplexers 1123a-1123n and adder 1125, as well as compensating for any delay caused by the multiplexers 1123a-1123n. That is, delay elements 1121a-1121n and 1124a-1124n may ensure proper data path pipelining for ASIC or FPGA route timing easement, to ensure that RF input signals and processed RF signal portions are able to be coherently recombined after DSP processing.

In other examples, delay elements 1121a-1121n and/or 1124a-1124n may be integrated into the DSP pipelines 1122a-1122n, respectively, and configurable to compensate for time delays and other latencies introduced by the different signal path lengths and multiplexer operation time to enable efficient and effective recombination of the RF signal portions. That is, delay elements 1121a-1121n and/or 1124a-1124n may be provided within the DSP pipelines 1122a-1122n instead of being provided separately as illustrated in FIG. 11.

Although discussed as a separate circuit module, similar to the discussion with respect to FIG. 9 the adder 1125 may alternatively be provided within the DSP pipelines 1122, with the outputs of the DSP pipelines 1122 coupled to the adders (not shown) in other DSP pipelines 1122. In particular, the output side of DSP pipelines 1122 may be connected in a daisy-chain construction such that processed RF signal portions can be directly communicated between the outputs of the DSP pipelines (daisy-chain communication lines are depicted as dashed lines between DSP pipelines 1122). For example, in a RF transceiver chip 1102 having four DSP pipelines 1122a-1122d, a processed RF signal portion from DSP pipeline 1122d may be communicated to the output side of DSP pipeline 1122c, wherein the processed RF signal portions of pipelines 1122c and 1122d are then added together by an adder (not shown) in the DSP pipeline 1122c before transmission to the output side of DSP pipeline 1122b in a manner similar to that illustrated in FIG. 10. Similarly, the combined RF signal portions at DSP pipeline 1122b are added to the recombined processed RF signal portions from DSP pipelines 1122c and 1122d and subsequently transmitted to the output side of DSP pipeline 1122a. Once the recombined processed RF signal portions communicated from DSP pipelines 1122b-1122d are received at the output side of DSP pipeline 1122a, they are added together to generate the coherently recombined RF output signal as discussed above. More or fewer than four DSP pipelines 1122a-1122d may be provided and recombined using adders provided in the DSP pipelines 1122 in the "daisy-chaining" manner without departing from the scope of the present disclosure.

Once the processed RF signal portions are coherently recombined at the adder 1125, or alternatively by the adders (not shown) in the DSP pipelines, to form the RF output signal, the RF output signal may be provided to the DAC 1126 for conversion to an analog RF signal based on the RF output signal and then processed by the RF output chain 1128a for transmission to an end user by antenna 1130a or optical transceiver 1131a.

In another example, where beamforming of a high-bandwidth RF input signal is desired, a signal line 1152a and/or 1152b may be used to transmit RF signal portions and/or recombined RF signal portions to dedicated beamforming modules, which may be provided on a separate RF transceiver chip 1101 or 1103 (or additional RF transceiver chips if they are provided). This distribution of RF signal portions may allow for a high-bandwidth RF input signal to be processed, beamformed, and transmitted to an end user by a plurality of RF transceiver chips communicatively coupled to each other within a system such as a satellite payload. These RF transceiver chips may be substantially similar in design and functionality and may be selectively configured to process portions of the high-bandwidth RF input signal, beamform the RF signal, and output a coherently recombined and beamformed RF output signal with the desired beam directionality and spatial diversity (e.g., narrow or wide) to an end user.

While the examples of the present disclosure have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. An integrated radio frequency (RE) transceiver implemented in a satellite, the integrated RF transceiver comprising:

one or more RF input chains each configured to receive an RE input signal having a bandwidth;
one or more analog to digital converters (ADCs) configured to generate a digital a based on the RE input signal;
a plurality of digital signal processor (DSP) pipelines configured to receive all or part of the digital signal, each DSP pipeline having a processing bandwidth;
a signal distribution network communicatively coupling the one or more ADCs and the DSP pipelines,
wherein based on the bandwidth of the RF input signal, the signal distribution network is configured to broadcast the digital signal from one ADC to the plurality of DSP pipelines, and wherein each DSP pipeline is configured to process a portion of the digital signal to generate a processed signal portion; and
at least one adder configured to coherently recombine the processed signal portions from the plurality of DSP pipelines to generate a digital output signal,
wherein when the bandwidth of the RE input signal is greater than the DSP pipeline processing bandwidth the signal distribution network is configured to broadcast the digital signal from one ADC to the plurality of DSP pipelines, and when the bandwidth of the RF input signal is less than or equal to the DSP pipeline processing bandwidth the signal distribution network is configured to provide the digital signals from the one or more ADCs and the one or more RE input chains to a corresponding DSP pipeline.

2. The integrated RF transceiver of claim 1, further comprising one or more digital to analog converters (DACs) configured to generate an RF output signal based on the digital output signal.

3. The integrated RF transceiver of claim 1, wherein the portion of the digital signal processed by each DSP pipeline is a portion of a bandwidth of the digital signal which corresponds to the bandwidth of the RF input signal.

4. The integrated RF transceiver of claim 1, wherein each of the DSP pipelines receives the broadcasted digital signal and is configured to select the portion of the broadcasted digital signal to perform processing on the portion.

5. The integrated RF transceiver of claim 4, wherein the DSP pipelines select the portion by filtering, mixing, and/or tuning.

6. The integrated RF transceiver of claim 1, wherein each RF input chain comprises an amplifier, balun, and/or filter, each with signal response characteristics.

7. The integrated RF transceiver of claim 6, wherein when the plurality of DSP pipelines receive the broadcasted digital signal from one ADC, the DSP pipelines are configured to compensate for the signal response characteristics of one RF input chain and/or the one ADC.

8. The integrated RF transceiver of claim 1, wherein at least one of the plurality of DSP pipelines comprises a near perfect reconstructing channelizer configured to generate at least one subchannel based on the digital signal or the broadcasted digital signal, and reconstruct the at least one processed subchannel, wherein the processed signal portions are the processed subchannels.

9. The integrated RF transceiver of claim 1, wherein an adder of the at least one adder is provided to each of the DSP pipelines;
the RF transceiver further comprises a daisy-chain signal line communicatively coupling the adders of the DSP pipelines; and
wherein the adders of the DSP pipelines are configured to form the digital output signal by coherently recombining the processed signal portions from the DSP pipelines.

10. The integrated RF transceiver of claim 9, wherein the daisy-chain signal line communicatively couples a first adder provided in a first DSP pipeline of the DSP pipelines to a second adder provided in a second DSP pipeline of the DSP pipelines; and
the first adder is configured to receive, by the daisy-chain signal line, a second processed signal portion from the second adder provided in the second DSP pipeline and add the second processed signal portion to a first processed signal portion from the first DSP pipeline.

11. The integrated RF transceiver of claim 1, wherein signal distribution network and/or the DSP pipelines include at least one delay element configured to variably delay the delivery of the broadcasted digital signal to the plurality of DSP pipelines.

12. The integrated RF transceiver of claim 11, wherein, based on a delay introduced by the at least one delay element, the broadcasted digital signal is provided to each of the plurality of DSP pipelines at substantially the same time.

13. A method of processing an RF input signal by an integrated radio frequency (RF) transceiver implemented in a satellite, the method comprising:
receiving, by an RF input chain, the RF input signal having a bandwidth;
converting, by an analog to digital converter (ADC), the RF input signal to a digital input signal;
providing, by a signal distribution network, the digital input signal to a plurality of digital signal processor (DSP) pipelines;
processing, by each of the plurality of DSP pipelines, a portion of the bandwidth of the digital input signal to generate a processed digital signal portion;
coherently recombining, by an adder, the processed digital signal portions to generate a digital output signal having substantially the same bandwidth as the RF input signal,
wherein when the bandwidth of the RF input signal is greater than the DSP processing bandwidth the signal distribution network is configured to broadcast the digital signal from one ADC to the plurality of DSP pipelines, and when the bandwidth of the RF input signal is less than or equal to the DSP processing bandwidth the signal distribution network is configured to provide the digital signals from the one or more ADCs and the one or more RF input chains to a corresponding DSP pipeline.

14. The method according to claim 13, further comprising converting, using a digital to analog converter (DAC), the digital output signal to an RF output signal.

15. The method according to claim 13, wherein each of the DSP pipelines processes a different portion of the digital input signal bandwidth.

16. The method according to claim 13, further comprising channelizing, by a near perfect reconstructing channelizer, the digital input signal.

* * * * *